United States Patent
Raj

(10) Patent No.: US 11,080,125 B1
(45) Date of Patent: Aug. 3, 2021

(54) IDENTIFYING AND CLUSTERING CALL STACKS ACROSS MULTIPLE MEMORY DUMPS WITH OUT-OF-MEMORY ERRORS

(71) Applicant: Oracle International Corporation, Redwood Shores, CA (US)

(72) Inventor: Santhosh Raj, Karnataka (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/823,614

(22) Filed: Mar. 19, 2020

(51) Int. Cl.
*G06F 11/07* (2006.01)

(52) U.S. Cl.
CPC ...... *G06F 11/0778* (2013.01); *G06F 11/0709* (2013.01)

(58) Field of Classification Search
CPC ............. G06F 11/0709; G06F 11/0751; G06F 11/0778; G06F 11/079
USPC ...................................................... 714/38.11
See application file for complete search history.

(56) References Cited

U.S. PATENT DOCUMENTS

| | | | | |
|---|---|---|---|---|
| 7,620,852 | B2 * | 11/2009 | Rodeheffer | G06F 9/524 714/42 |
| 8,549,359 | B2 | 10/2013 | Zheng | |
| 9,589,074 | B2 * | 3/2017 | Bhattacharjee | G06F 16/9038 |
| 9,760,464 | B1 | 9/2017 | Helliwell et al. | |
| 9,830,215 | B1 * | 11/2017 | Mathew | G06F 11/079 |
| 10,108,475 | B2 | 10/2018 | Chikabelapur et al. | |
| 10,191,837 | B2 | 1/2019 | Gadi et al. | |
| 2011/0161956 | A1 | 6/2011 | Vennam et al. | |
| 2015/0082210 | A1 | 3/2015 | Sedlacek | |
| 2016/0335169 | A1 | 11/2016 | Bhattacharyya et al. | |
| 2017/0147442 | A1 * | 5/2017 | Xiao | G06F 11/36 |
| 2017/0177272 | A1 | 6/2017 | Ilangovan et al. | |
| 2020/0334093 | A1 * | 10/2020 | Dubey | G06F 11/0778 |

OTHER PUBLICATIONS

"Automating—Outofmemoryerror Troubleshooting", Fast Thread, Universal Java Thread Dump Analyzer, retrieved from: https://blog.fastthread.io/2019/06/12/automating-outofmemoryerror-troubleshooting/, Jun. 12, 2019, 3 pages.

"Heap Dump Analysis API", Heap Hero—Java & Android Heap Dump Analyzer, retrieved from: https://blog.heaphero.io/2018/06/22/heap-dump-analysis-api/, Jun. 22, 2018, 17 pages.

* cited by examiner

*Primary Examiner* — Joseph R Kudirka
(74) *Attorney, Agent, or Firm* — Kilpatrick Townsend & Stockton LLP

(57) ABSTRACT

A method of clustering call stacks from a memory dumps resulting from out-of-memory errors includes accessing a memory dump resulting from an out-of-memory error; identifying call stacks in the memory dump that are associated with the out-of-memory error; accessing call stacks from one or more other memory dumps that were determined to be associated with other out-of-memory errors; generating clusters of call stacks based on a similarity score; and providing a cluster for an analysis of the out-of-memory error.

20 Claims, 17 Drawing Sheets

IDENTIFYING AND CLUSTERING CALL STACKS ACROSS MULTIPLE MEMORY DUMPS WITH OUT-OF-MEMORY ERRORS

BACKGROUND

Managing large businesses may involve storing, aggregating, and analyzing large amounts of data. Many organizations use Enterprise Software Systems to manage almost every form of business data. For example, Enterprise Software Systems can provide business-oriented tools such as online shopping and online payment processing, interactive product catalogs, automated billing systems, security, enterprise content management, IT service management, customer relationship management, enterprise resource planning, business intelligence, project management, collaboration, human resource management, manufacturing, enterprise application integration, and Enterprise forms automation.

Many errors may occur when using large software systems, such as Enterprise Software Systems. One common error is an out-of-memory (OOM) error. An OOM error is a state of computer operation where no additional memory can be allocated for use by applications or the operating system of the computer system. When such an error occurs, the computer system will be unable to load any additional programs or perform any additional computations that require new memory allocation. Since many programs load additional data into memory during execution, currently running applications may cease to function correctly. An OOM error occurs when all available memory, often including virtual memory, has been allocated.

BRIEF SUMMARY

In some embodiments, a method of clustering call stacks from a plurality of memory dumps resulting from out-of-memory errors may include accessing a memory dump resulting from an out-of-memory error; identifying one or more first call stacks in the memory dump that are determined to be associated with the out-of-memory error; accessing one or more second call stacks from one or more other memory dumps that were determined to be associated with one or more other out-of-memory errors; generating a plurality of clusters for the one or more first call stacks with the one or more second call stacks; and providing a cluster from the plurality of clusters for an analysis of the out-of-memory error.

In some embodiments, a non-transitory computer-readable medium may include instructions that, when executed by one or more processors, cause the one or more processors to perform operations including accessing a memory dump resulting from an out-of-memory error; identifying one or more first call stacks in the memory dump that are determined to be associated with the out-of-memory error; accessing one or more second call stacks from one or more other memory dumps that were determined to be associated with one or more other out-of-memory errors; generating a plurality of clusters for the one or more first call stacks with the one or more second call stacks; and providing a cluster from the plurality of clusters for an analysis of the out-of-memory error.

In some embodiments, a system may include one or more processors and one or more memory devices with instructions that, when executed by the one or more processors, cause the one or more processors to perform operations including accessing a memory dump resulting from an out-of-memory error; identifying one or more first call stacks in the memory dump that are determined to be associated with the out-of-memory error; accessing one or more second call stacks from one or more other memory dumps that were determined to be associated with one or more other out-of-memory errors; generating a plurality of clusters for the one or more first call stacks with the one or more second call stacks; and providing a cluster from the plurality of clusters for an analysis of the out-of-memory error.

In any embodiments, any or all of the following features may be implemented in any combination and without limitation. The method/operations may also include processing the memory dump with a memory analysis tool that indexes the memory dump and generates a statistical analysis of object types found in the memory dump. The memory dump may include objects allocated on a heap. Identifying the one or more first call stacks in the memory dump may include identifying object classes that consume the most memory in the memory dump, and identifying the one or more first call stacks as referencing the object classes that consume the most memory in the memory dump. Identifying the one or more first call stacks in the memory dump may include calculating an amount of memory used by a process; determining a maximum amount of memory allowed to be used by the process; calculating a ratio of the memory used by the process in comparison to the maximum amount of memory allowed to be used by the process; and identifying the one or more first call stacks as belonging to the process if the ratio exceeds a predetermined threshold. Identifying the one or more first call stacks in the memory dump may include identifying a thread for which a memory request triggered the out-of-memory error; and identifying the one or more first call stacks as belonging to the thread. Identifying the one or more first call stacks in the memory dump may include identifying one or more threads operating for more than a predetermined time limit; and identifying the one or more first call stacks as belonging to the one or more threads. Identifying the one or more first call stacks in the memory dump may include identifying one or more worker threads that were processing events or requests when the out-of-memory error occurred; determining whether an amount of memory used by the one or more worker threads exceeds a predetermined threshold; and identifying the one or more first call stacks as belonging to the one or more worker threads. The method/operations may also include storing the one or more first call stacks in a document repository with the one or more second call stacks. Generating the plurality of clusters may also include dividing each of the one or more first call stacks and the one or more second call stacks into a plurality of layers. Generating the plurality of clusters may also include generating a similarity score between each of the plurality of layers individually. Generating the plurality of clusters may also include generating a full stack similarity score through a weighted combination of the similarity score for each of the plurality of layers. The similarity score may include a cosine similarity where each unique word in a stack line represents a dimension, and where a number of occurrences of each unique word represents a magnitude of a vector. Generating the plurality of clusters may include using a Density-based Spatial Clustering of Application with Noise (DBSCAN) algorithm to form the plurality of clusters from a similarity matrix, where the similarity matrix may store a similarity score for each combination of call stacks. The method/operations may also include highlighting similarities between call stacks in the cluster from the plurality of clusters.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Described herein are embodiments for analyzing a plurality of memory dumps resulting from out-of-memory (OOM) errors to identify a root cause of a current OOM error. When an OOM error occurs, a memory dump analysis tool can characterize the contents of the memory at the time of the error. The contents of the memory can be used to identify one or more call threads with corresponding call stacks that are likely to be associated with the error. These call stacks can be saved as documents that are subdivided into different layers corresponding to different functional areas, such as framework code, web logic code, third-party code, application code, and so forth. Each of these layers can then be compared to previous documents representing call stacks from previous OOM errors. A similarity score can be calculated between each of the layers for each pair of documents. A total similarity score between two documents can then be generated as a weighted combination of layer similarity scores and stored in a similarity matrix. A clustering algorithm may then be used to generate clusters of similar call stacks. When analyzing the current OOM error, the current call stacks of interest may be provided along with any similar call stacks from previous OOM errors clustered with the current call stacks of interest. This provides a large number of call stacks that may be analyzed to determine the root cause of the current OOM error. This additional data may reveal patterns or similarities between a large number of OOM errors that may not be immediately apparent in any individual call stack. This allows code that causes OOM errors to be more readily identified and reduces the need to replicate OOM errors during the analysis process.

Figure 1:
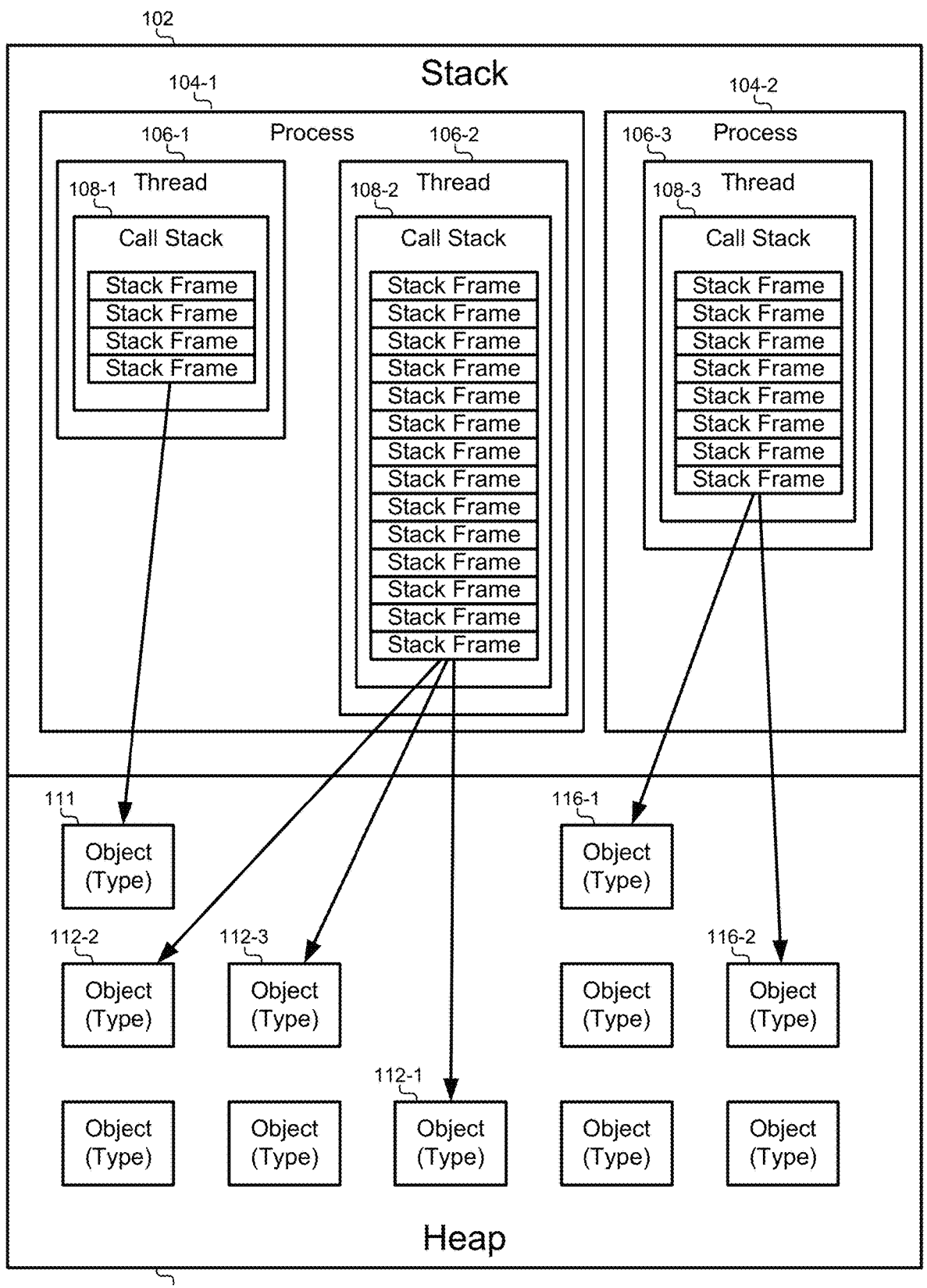
FIG. 1 illustrates a diagram of a computer memory at the time of an OOM error, according to some embodiments.

FIG. 1 illustrates a diagram of a computer memory at the time of an OOM error, according to some embodiments. This diagram is a simplified diagram that shows the basic contents of the memory that may be of interest when characterizing a root cause of an OOM error. Therefore, it should be understood that the memory shown in this diagram may include many additional elements, objects, processes, functions, relationships, and/or other contents that may be commonly found in computer memories, but which have not been shown in this diagram for the sake of clarity. Therefore, this diagram is provided by way of example only and is not meant to be limiting.

The memory may include a stack 102 where a plurality of processes 104 operate. Each of the processes 104 may include one or more threads 106. Each of the threads 106 may include a call stack 108 that includes a plurality of stack frames. Stack frames may be pushed and/or popped from the call stacks 108 as the threads execute. Generally, each of the threads 106 may be associated with a single call stack 108. Each of the call stacks 108 may be allocated in the stack 106 as they are executed. For example, when a process 104-1 creates a new thread 106-1, the thread 106-1 may allocate a call stack 108-1 in the stack 102. As different functions are called/exited within the code of the thread 106-1, stack frames may be added to or removed from the call stack 108-1 as needed.

The memory may also include a heap 110. The heap 110 may use the same logical/physical memory resource as the stack 102. However, they heap 110 may be allocated from a "bottom" of the memory, while the stack 102 may be allocated from a "top" of the memory (e.g., using a numerical address space). In contrast to the stack 102, the heap 110 may include objects that are dynamically allocated at runtime by processes 104 and/or threads 106. Objects may allocated and associated with individual stack frames. Depending on the particular programming language used, objects may be allocated when the code in the stack frame is executed, and then released when the stack frame is popped or removed from the corresponding call stack 108. Alternatively, memory may be released using specific instructions to "delete" or "free" the memory, or using an automatic garbage collection process. In this example, call stack 108-1 has allocated object 111, call stack 108-2 has allocated objects 112, and call stack 108-3 has allocated objects 116. These objects may be freed when the corresponding threads release them or are finished with them.

An OOM error occurs when all available memory in the computer system has been allocated. This can prevent the computer system from loading additional programs and can cause currently running programs to cease functioning correctly. For example, in a Java virtual machine (JVM), this can halt the JVM, as the JVM cannot create a "new" instance/allocate memory to an object because it is out of memory, and no more memory may be made available by the garbage collector. The cause of an OOM error may generally be traced back to code that allocates new objects in the heap 110 without releasing those objects to free the memory for other processes or threads. An OOM error may also be caused by iterative or recursive loops that repeatedly allocate new objects on the heap 110 until the memory is full. Generally, when an OOM error occurs, the only available diagnostic information comes in the form of a memory dump. The OOM error may trigger a process that writes the contents of the memory of the computer system (e.g., RAM, virtual memory, etc.) to disk. In this example, the memory dump may include all of the contents of the memory illustrated in FIG. 1, along with any other memory contents not explicitly depicted. Thus, the memory dump may include a snapshot of memory at the time the OOM error occurred. In some cases, a virtual machine may be responsible for capturing and saving the memory dump. The memory dump may also be referred to as a binary dump, binary heap dump, heap dump, and in the case of a Java virtual machine, a JVM heap (.hprof file).

The embodiments described herein provide methods and systems that analyze the contents of the memory dump in order to provide data for accurately determining the root cause the OOM error. First, the memory dump may be processed by a memory analysis tool. The memory analysis tool can be configured to identify "leak suspects," or identify the "accumulation points" of those object classes that occupy a large percentage of the memory dump. As described above, most OOM errors are caused by a process continually allocating new objects without releasing the associated memory when those objects are no longer needed. For example, a process may include a loop that allocates a predefined number of objects (e.g. mallac( )). If the memory associated with those objects is not released (e.g. free( )) when the objects are no longer needed, then more objects will be allocated every time the loop executes until an OOM error occurs. There are a number of commercially available memory analysis tools that may be used as the memory analysis tool, including the HeapAnalyzer tool from IBM™ and/or the Eclipse™ Memory Analyzer.

The memory analysis tool can be used to generate a list of leak suspects that may be responsible for the OOM error. Some memory analysis tools may also generate an indexed memory dump that may also be useful in the analysis process. Note that some embodiments may make use of the indexed memory dump, while other embodiments can simply use the original memory dump provided by the virtual machine. The list of leak suspects may include a listing of all object classes represented in the memory dump that occupy more than a threshold percentage or threshold amount of memory. The list of leak suspects may also be characterized as the top N object classes represented in the memory dump. The memory analysis tool can expose an API interface that provides access to the indexed memory dump as well as the list of leak suspects. Therefore, some embodiments may initially process the memory dump using a memory analysis tool to provide statistical and/or indexed information regarding classes of objects stored in the memory.

Figure 2:
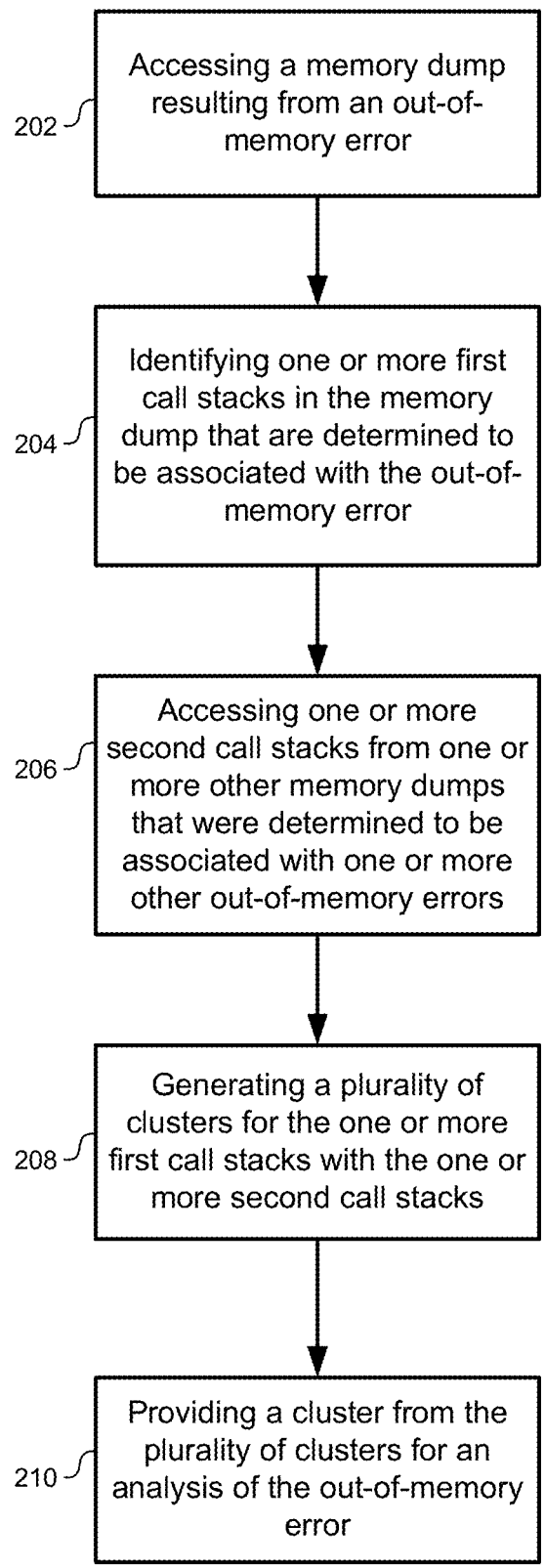
FIG. 2 illustrates a flowchart of a method of clustering call stacks from a plurality of memory dumps resulting from OOM errors, according to some embodiments.

FIG. 2 illustrates a flowchart 200 of a method of clustering call stacks from a plurality of memory dumps resulting from OOM errors, according to some embodiments. Each of the steps in flowchart 200 may include a number of sub-steps or alternatives that are described in detail in the remainder of this disclosure. The method of flowchart 200 may be executed by a computer system comprising one or more processors and one or more memory devices using instructions stored on a non-transitory computer-readable medium. The method may include accessing a memory dump resulting from an OOM error (202). In some embodiments, this method may be executed in response to an OOM error occurring and/or receiving a memory dump resulting from the OOM error. As described above, some embodiments may also process the memory dump using a memory analysis tool that can analyze and index the memory dump. This may provide usage statistics for different classes within the memory dump, and may index the memory dump to make it easier to parse.

The method may further include identifying one or more first call stacks in the memory dump that are determined to be associated with the OOM error (204). A number of different methods may be used to identify the first call stacks in the memory dump, each of which are described in detail below. For example, classes of objects may be identified from a histogram or percentage of memory usage based on how many objects of that class type occupy the memory dump. Some embodiments may also identify an amount of memory used by a process in comparison to a maximum memory limit of the process. Some embodiments may identify a thread which triggered the OOM error event by parsing the memory dump. In some cases, long-running requests or threads may be identified, which may indicate processes or loops that have stalled in execution. For example, web logic server requests running for more than 10 minutes may be marked as stalled. Some embodiments may identify threads that were responsible for making the memory allocation request that caused the OOM error to occur. In some cases, the process may also identify threads that were currently processing requests, such as worker threads. For each of these threads, the associated call stacks may be identified as likely being related to the OOM error. A text version of the call stacks from the current OOM error may then be stored as documents in a repository.

The method may also include accessing one or more second call stacks from one or more other memory dumps that were determined to be associated with one or more OOM errors (206). The second call stacks may have been identified and stored from previous OOM errors using the process described above. Some embodiments may store a repository of call stacks or call stack documents in a document repository, each of which may be related to other OOM errors. This may create a running repository that collects call stack documents as they are identified when OOM errors occur.

The method may additionally include generating a plurality of clusters for the one or more first call stacks with the one or more second call stacks (208). As described in detail below, each of the one or more first call stacks from the current memory dump may be compared with each of the second call stacks from other memory dumps. In some embodiments, each of the call stacks may be divided into different layers, such as a server or development kit (JDK) layers, a web logic or infra code layer, a third-party code layer such as security APIs, a language framework code layer, an application code layer, and/or any other logical grouping of stack frames in the call stack. Layers within each of the first/second call stacks may be compared to each other to generate a similarity score between each of the call stack layers. Then, the similarity scores for each layer may be combined together in a weighted combination to form an overall similarity score for each pair of call stacks. These similarity scores for each pair may be used to form a similarity matrix that stores similarity scores between each pair of call stacks. A clustering algorithm, such as a density-based spatial clustering of applications with noise (DB-SCAN) algorithm may be used to form clusters of call stacks based on the similarity scores for each.

The method may further include providing a cluster from the plurality of clusters for an analysis of the OOM error (210). For example, each of the one or more first call stacks may be associated with one or more of the clusters formed above. In some cases, multiple call stacks from the one or more first call stacks for the current memory dump may be clustered together in the same cluster. Each cluster associated with the one or more first call stacks from the current memory dump may be provided for analysis. In some cases, the system may highlight portions of the call stacks in each cluster that are most similar across the cluster to draw attention to common features between each of the call stacks in each of the clusters that may be responsible for the OOM error.

It should be appreciated that the specific steps illustrated in FIG. 2 provide particular methods of clustering call stacks from a plurality of memory dumps resulting from OOM errors according to various embodiments. Other sequences of steps may also be performed according to alternative embodiments. For example, alternative embodiments may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. Many variations, modifications, and alternatives also fall within the scope of this disclosure.

Figure 3:
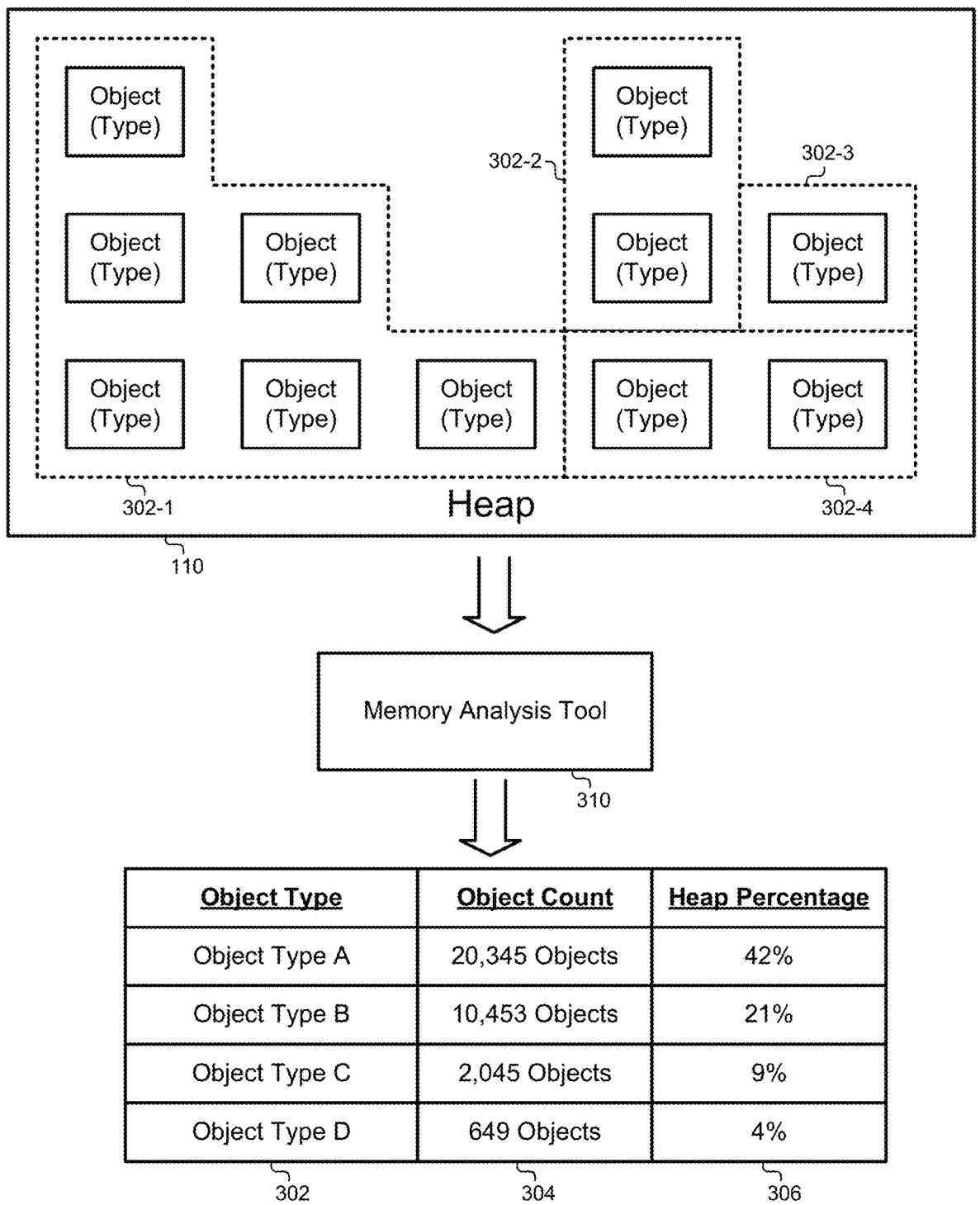
FIG. 3 illustrates a diagram of how call stacks may be identified from the memory dump using the memory analysis tool, according to some embodiments.

FIG. 3 illustrates a diagram of how call stacks may be identified from the memory dump using the memory analysis tool, according to some embodiments. In this example, the memory analysis tool 310 may receive at least the heap 110 from the memory dump after the OOM error has occurred. Although not shown explicitly, some embodiment may also receive at least some contents of the stack 102 from FIG. 1. The memory analysis tool 310 may parse the heap 110 and categorize information and metadata regarding all of the different objects that have been allocated in the heap 110. In some embodiments, the memory analysis tool 310 may group together various objects by type. In this example, the memory analysis tool 310 may group together the objects in the heap 110 into groups 302, with each related to a specific class of object.

In addition to identifying classes and/or types for each of the objects stored in the heap 110, the memory analysis tool 310 may generate statistical characterizations of the heap 110 based on these object types. For example, an output from the memory analysis tool 310 may include a table of object types that includes the different object classes 302 identified by the memory analysis tool 310, along with a raw count 304 of objects from that type in the heap 110. Some embodiments may provide a statistical analysis of the object count 302 in relation to the total heap size. For example, the output may include a percentage 306 of the total memory in the heap 110 occupied by objects of each type of object class 302.

The method may identify one or more of the object types/classes 302 that may be related to the OOM error. This may be done by comparing statistical characterization(s) of each type 302 to various thresholds. For example, some embodiments may identify object types with a heap percentage 306 greater than a threshold, such as 30%, 25%, 20%, 15%, 10%, 5%, and/or any other threshold. Some embodiments may identify a predetermined number of the types 302 having the largest heap percentage 306. For example, some embodiment may identify the top approximately 1, 2, 3, 5, 10, etc., object types 302 based on heap percentage 306. Some embodiments may identify object types/classes based on a raw object count 304. For example, some embodiments may identify a predetermined number of classes based on raw object count 302 and/or any classes 302 having an object count 302 above a predetermined threshold, such as 10,000 objects, 5000 objects, 2500 objects, and so forth. Other embodiments may combine these various thresholds together to identify the top memory-consuming classes in the heap 110.

Figure 4:
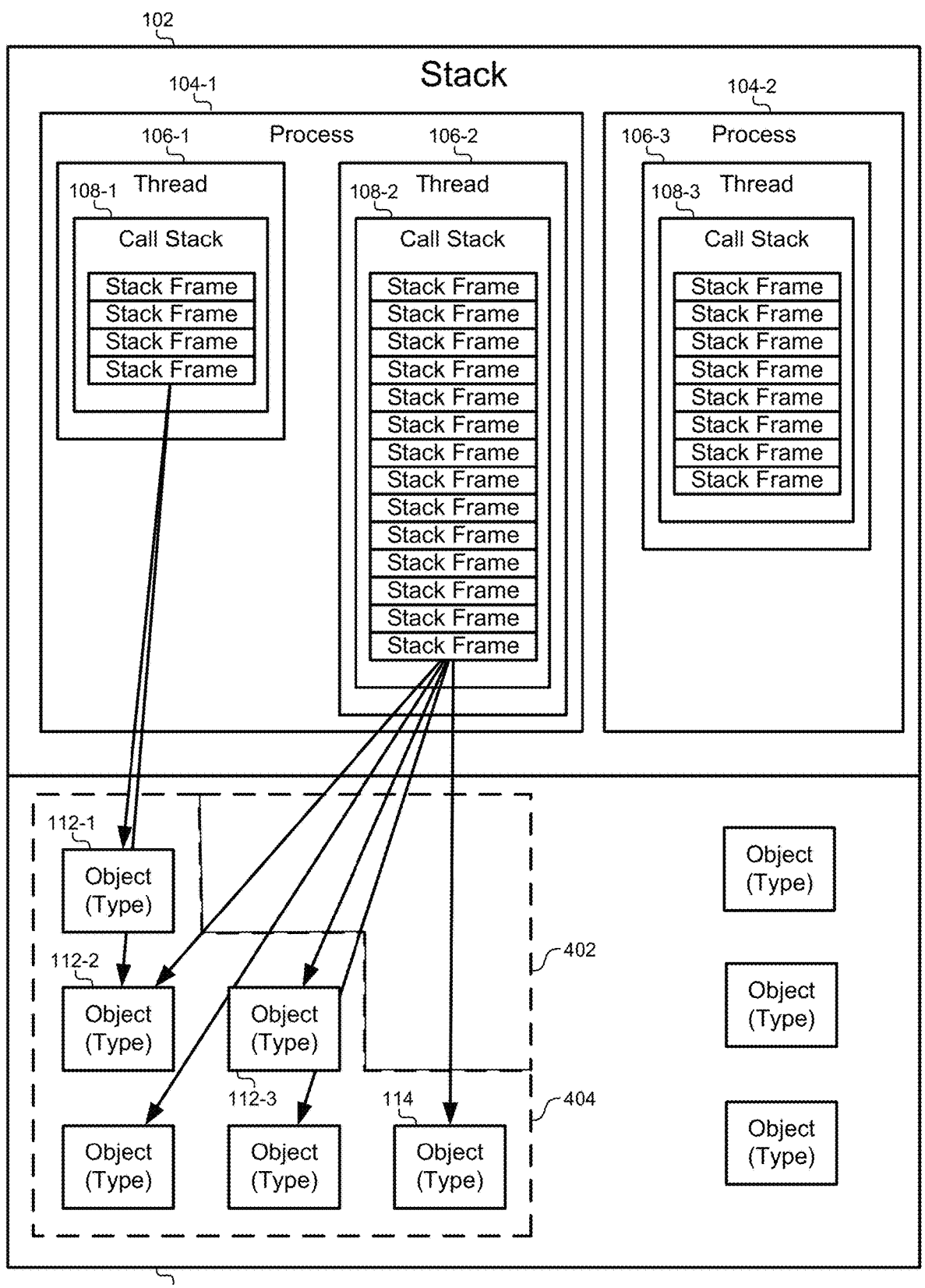
FIG. 4 illustrates an example of how processes may be identified as being related to the OOM error, according to some embodiment.

FIG. 4 illustrates an example of how processes may be identified as being related to the OOM error, according to some embodiment. Another preliminary step that may be taken by the system in identifying call stacks that may be associated with an OOM error is to identify an amount of memory used by a process in relation to a maximum amount of memory available to the process. In this example, a process 104-1 may include a plurality of threads 106-1, 106-2, each of which has an associated call stack. When analyzing the heap 110, each of the objects that are associated with stacks 108-1, 108-2 may be identified and used to calculate a total amount of memory used by the process 104-1. In some cases, this amount may also include memory used on the stack 102 for the call stacks 108-1, 108-2. The output of the memory analysis tool described above that identifies individual objects and classes in the heap 110 may be used to identify each of these objects and the total amount of memory used by the corresponding process 104-1.

The total amount of memory may then be compared to a maximum memory limit of the process 104-1. The maximum memory limit of the process 104-1 may be set to be any value and may be set by any system or software process, including an operating system or a virtual machine. The total memory used and the maximum memory limit of the process 104-1 may then be used to calculate a ratio between the two memory values, which may then be used to indicate a percentage of the maximum memory limit used by the process 104-1 when the OOM error occurred. In the example of FIG. 4, the total memory 404 used by the process 104-1 may be compared to a maximum memory limit 402 of the process 104-1 to determine that approximately 66% of the memory limit for the process 104-1 has been used (e.g., a 2:1 ratio). This value may be of use to some embodiments for identifying call stacks that are associated with the OOM error because it may indicate that a process that uses a relatively high percentage of its maximum memory limit may be the cause of the OOM error.

Figure 5:
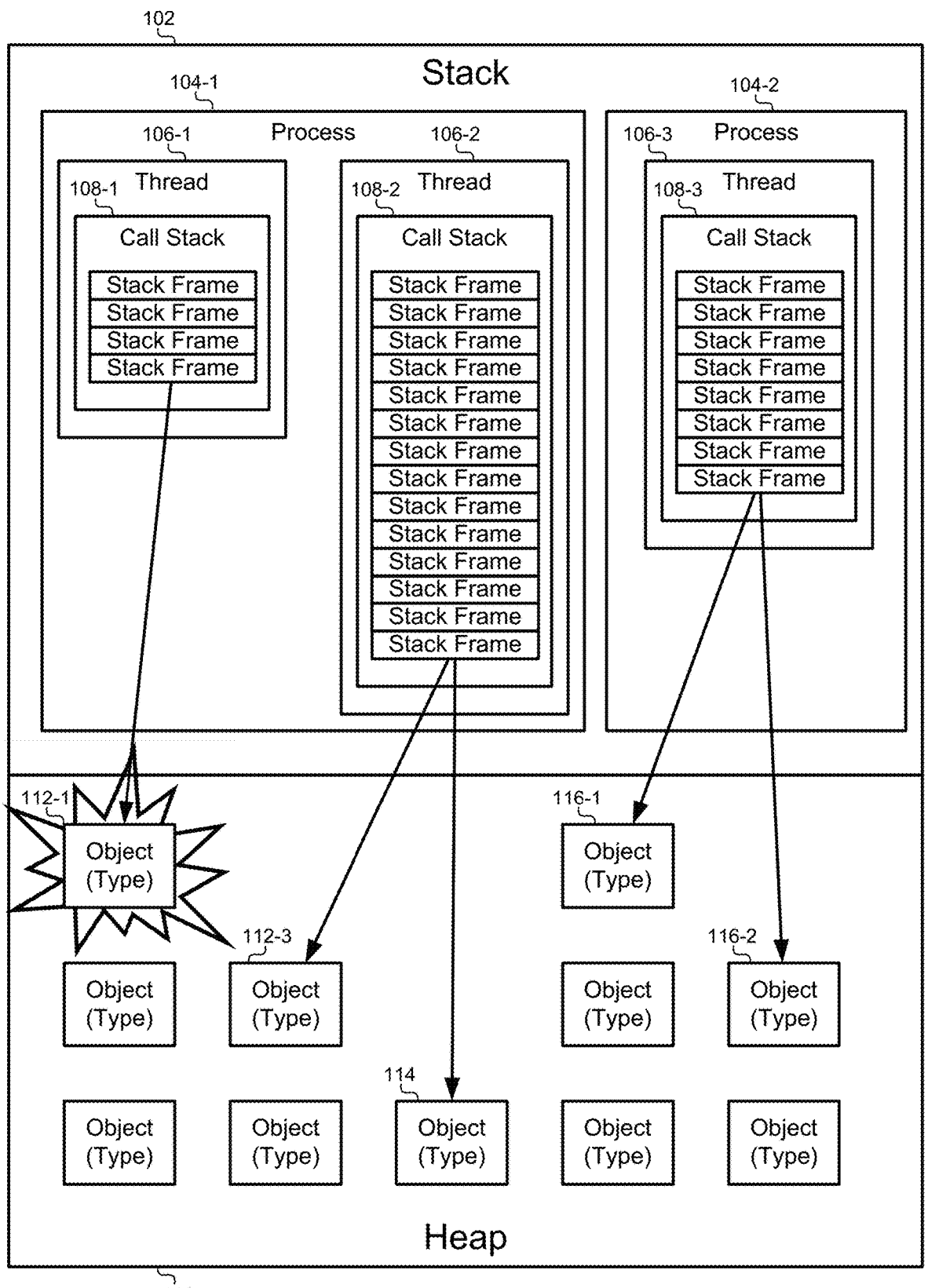
FIG. 5 illustrates an example of how a call stack may be identified that caused the OOM error, according to some embodiments.

FIG. 5 illustrates an example of how a call stack may be identified that caused the OOM error, according to some embodiments. Another type of call stack that may be of interest may include the call stack that requested a new memory allocation in the heap 110 that could not be serviced. In other words, the thread that actually caused the OOM error with a new memory request may be of interest. In this example, thread 106-1 may have generated a request for a new memory allocation (e.g., a "new" command in Java). If the heap 110 was out of memory, the request for the new object 112-1 may have caused a heap overrun and generated the OOM error. Note that other threads 106-2, 106-3 may also be running concurrently with the thread 106-1 that caused the OOM error, so the memory leak need not necessarily be attributed to the thread 106-1.

Figure 6:
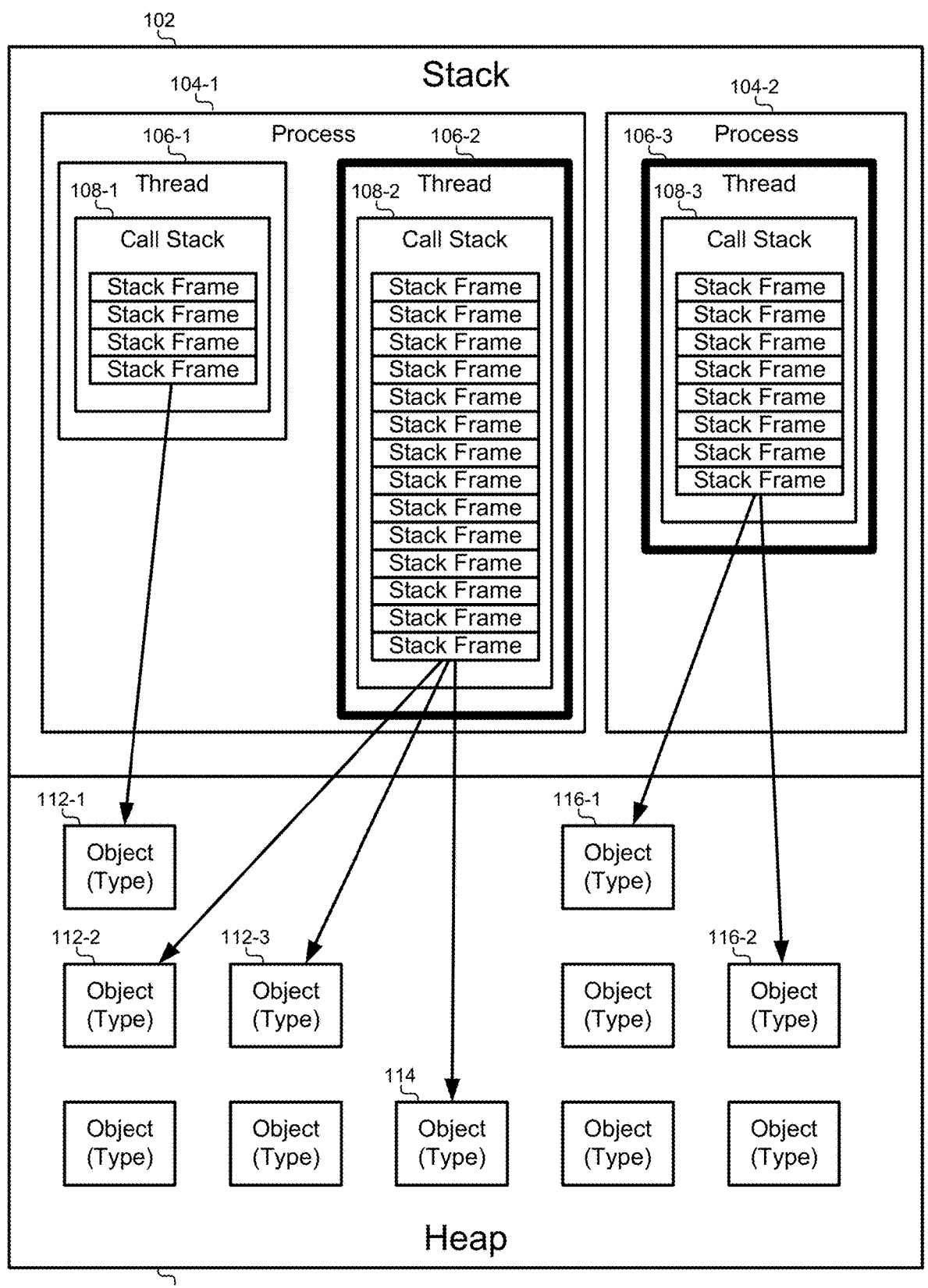
FIG. 6 illustrates an example of identifying stalled threads that run longer than other threads, according to some embodiments.

FIG. 6 illustrates an example of identifying stalled threads that run longer than other threads, according to some embodiments. As described above, some embodiments may detect threads that become stalled or "stuck." These threads may be in an endless loop, in an endless recursion cycle, and/or be waiting for other processes to complete. In this example, thread 106-2 and thread 106-3 may be considered long-running threads. For example, a WebLogic server may request the identity of threads running longer than a threshold amount of time, such as approximately 5 minutes, 10 minutes, 15 minutes, and/or any other time limit. For example, these threads may be threads that are repeatedly requesting new memory being allocated in the heap 110, thereby causing the memory leak.

Figure 7:
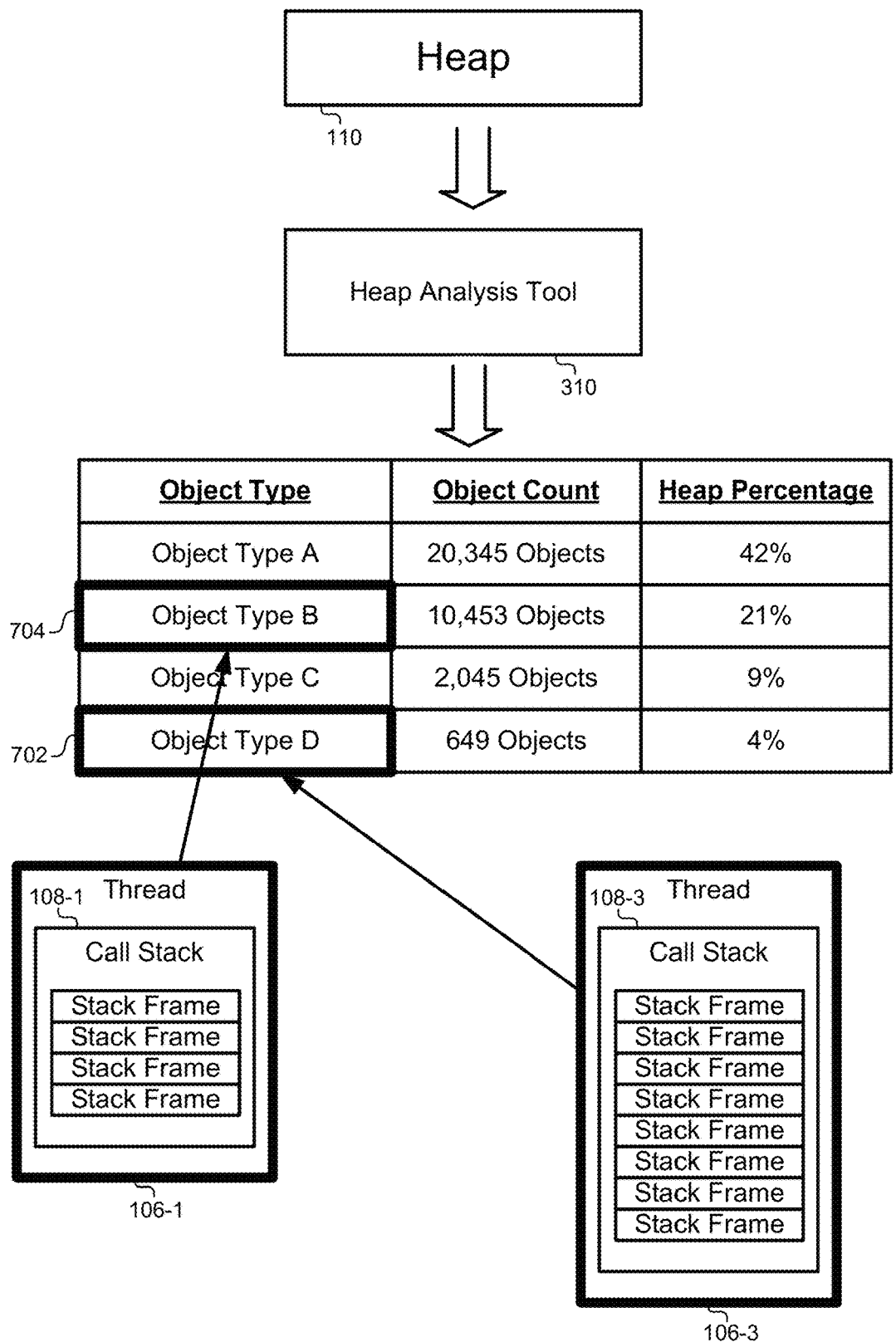
FIG. 7 illustrates identifying threads that were associated with the OOM error, according to some embodiments.

FIG. 7 illustrates identifying threads that were associated with the OOM error, according to some embodiments. Threads may be identified that are suspected to be responsible for the memory leak by parsing the memory dump to identify threads associated with different object types. For example, threads 106-1, 106-3 may be identified as threads holding references to objects identified by the heap analysis tool 310. These references for objects that occupy above a threshold percentage or amount of the heap memory may indicate that the code in a particular thread is responsible for the memory leak by repeatedly requesting memory allocations without freeing the memory.

Figure 8:
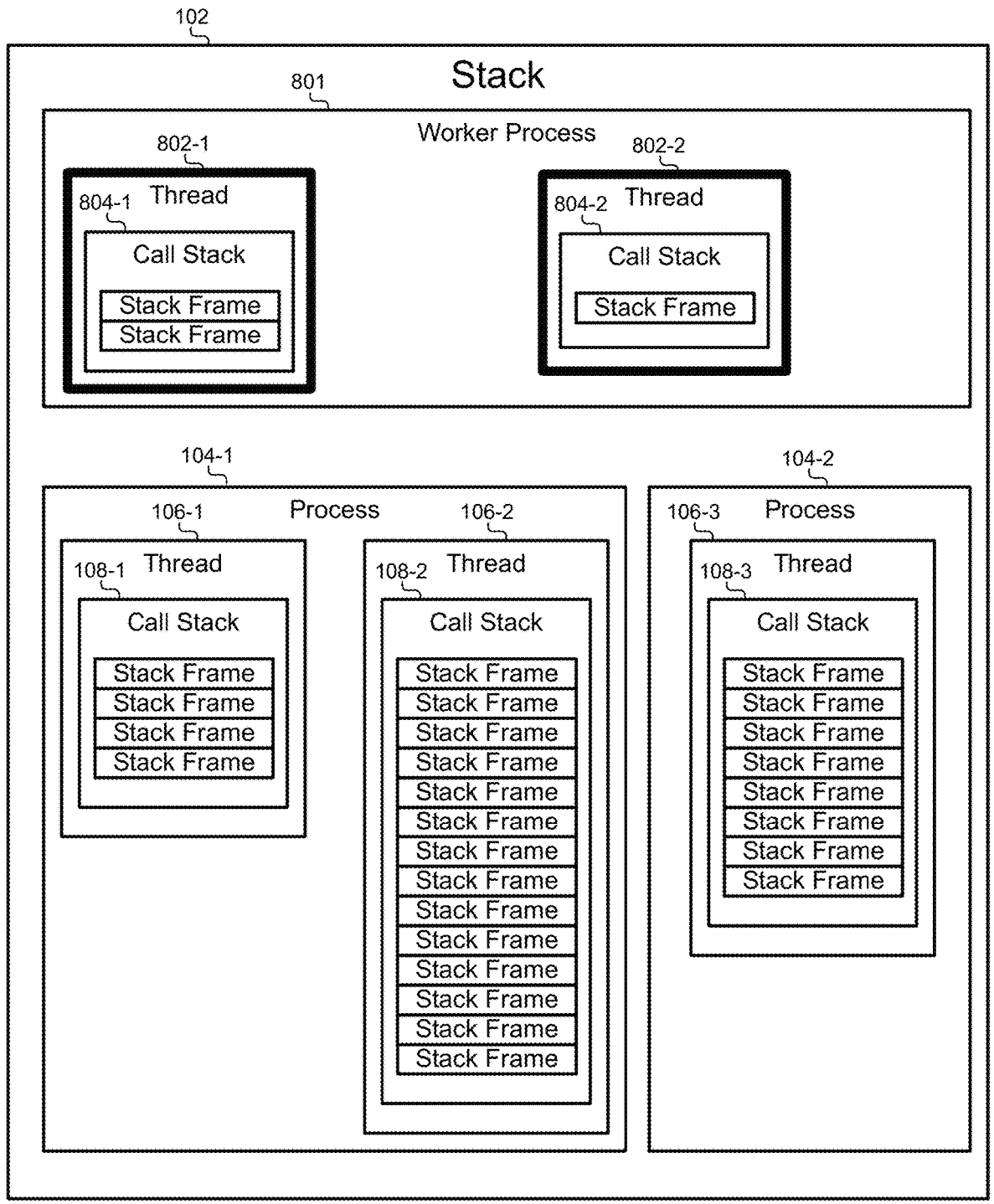
FIG. 8 illustrates a process for identifying worker threads, according some embodiments.

FIG. 8 illustrates a process for identifying worker threads, according some embodiments. A worker thread is a tool for executing different tasks in multiple parallel contexts of execution concurrently. They are particularly used in multi-processor and/or multi-threaded environments. A worker thread is a continuous parallel thread that may run and accept messages until it is terminated. Data may be shared between a parent thread and an associated worker thread, and they are particularly useful for performing CPU-intensive JavaScript operations. Any worker threads that were processing requests and/or events in the background at the time of the OOM error may be identified. In this example, two worker threads 802-1 and 802-2 may be identified along with their associated call stacks 804-1, 804-2.

Figure 9:
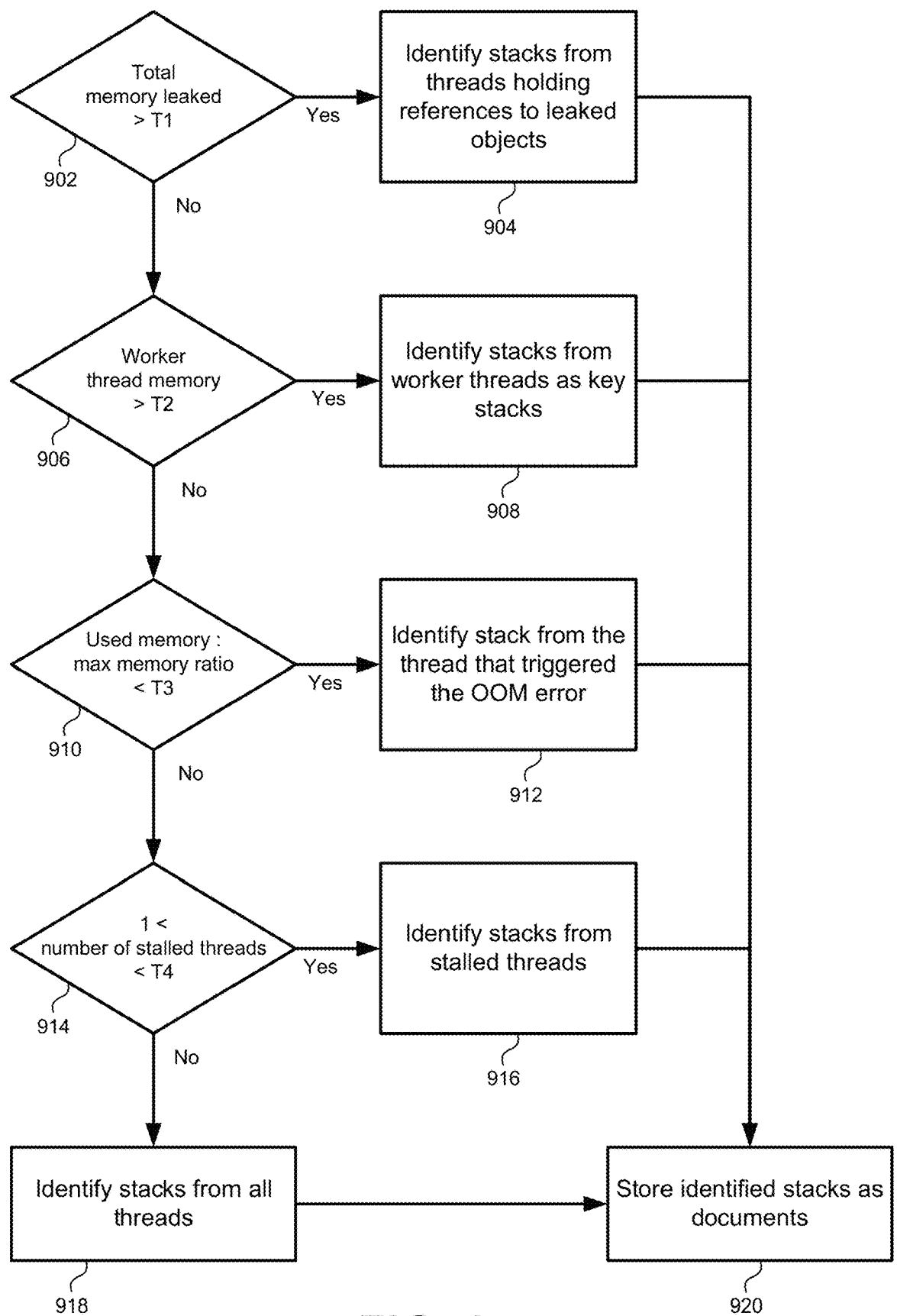
FIG. 9 illustrates a flowchart of a method for identifying call stacks as being associated with an OOM error, according to some embodiments.

FIG. 9 illustrates a flowchart of a method for identifying call stacks as being associated with an OOM error, according to some embodiments. Using the information gathered above as described in relation to FIGS. 3-8, this method may take the identified threads and/or associated call stacks and identify a subset of those call stacks (e.g., "key stacks") that should be saved as being related to the OOM error. This method prioritizes the different call stacks that were identified above to use those most likely responsible for the OOM error in the order illustrated in FIG. 9.

The method may include determining whether the total memory leaked is greater than a first threshold (902). The method may determine whether the total leaked memory from each process is larger than a threshold (T1). This helps distinguish small memory leaks that may existing programs that are not the cause of the OOM error from larger memory leaks that likely are the cause. Large programs may have a number of smaller memory leaks in their code, but none of these individually may be the main cause of the OOM error. Instead, this threshold seeks to identify a process that is primarily responsible for the OOM error. For example, the threshold value T1 may be chosen such that the probability of the corresponding threads of the process being the cause of the OOM error is greater than 90%. This may be determined by determining whether a process holds references to leaked objects as identified by the memory analysis tool. The method may then include identifying call stacks from threads that hold the references to the leaked objects (904). These call stacks may be identified as being associated with the OOM error, and may be stored as documents (920). For example, these call stacks may be stored as a textual description of the different stack frames within the call stack in a structured or unstructured document (e.g., XML, plaintext, etc.) in a repository.

The method may also include determining whether the worker thread memory is greater than a predetermined threshold (906). The value of the second threshold (T2) may again be selected such that the probability of a worker thread being the cause of the OOM error is more than 90%. Generally, worker threads do not consume an excessive amount of memory compared to other processes, therefore the second threshold (T2) may be set slightly above the normal working memory usage of worker threads in the system. If the memory used by worker threads is above the threshold, the method may identify call stacks from the worker threads as key stacks (908) to be saved as documents from this OOM error (920). Note that each of these thresholds (T1, T2, etc.) have values that may be chosen based on each individual operating environment and application. Guidance for setting these thresholds may include examining previous memory dumps and OOM errors and setting the threshold such that approximately 90% of the errors are correctly categorized by the thresholds. Other embodiments may use success thresholds of 80%, 75%, 95%, 70%, and so forth.

The method may additionally include determining whether the used memory ratio calculated above is less than a third predetermined threshold (910). Recall that the total memory usage of a process may be compared to a maximum allowed memory usage for the process, and a percentage or ratio of used memory to the maximum memory may be calculated. This may be compared to a third threshold (T3) to determine whether the memory usage was high enough to indicate that the threads of this process are responsible for the OOM error. Again, the threshold T3 may be selected based on historical data to capture approximately 90% (or another threshold percentage) of errors due to this type of situation. If the threshold is exceeded, the process may identify stacks from the threads that triggered the OOM error (912) and store them as documents (920).

The method may further include determining whether a number of stalled threads identified above falls within a predetermined range (914). For example, if the number of stalled threads is greater than 1 and less than T4 (three threads, four threads, five threads, etc.) then the long-running threads may have their corresponding call stacks identified as key stacks (916) and stored as documents (920). The threshold number of threads T4 may be selected such that the probability of long-running threads being the cause of the OOM error being correctly identified is more than 80% based on historical data. Long-running threads may be a side effect of the memory constraint itself, so the threshold T4 may be chosen to have the lowest value that provides the required success rate.

If none of the conditions described above are met, then the process may identify all stacks from running threads (918) and store the call stacks as documents (920). As used herein, the term "documents" may refer to any storage format that may be used to store the current state of a call stack, including a description or identifier for stack frames and any information provided in each of the stack frames. In some embodiments, these documents may be stored in a repository, such as a data store, a database, a text file, and/or any other storage format. The repository may include documents that describe call stacks from previous OOM errors that occurred in the system. For example, each time and OOM error is recorded, the memory dump may be analyzed as described above, and the key stacks from the analysis may be stored as documents. This may build a repository of all stacks that are associated with OOM errors in a system.

When a new OOM error occurs, the key stacks for the current OOM error may be identified and used to analyze the cause of the OOM error. However, instead of focusing on a single set of call stacks for a single OOM error, the embodiments described herein may form clusters of similar call stacks for other OOM errors. For each call stack identified as being associated with the current OOM error, the system may also produce a cluster of call stacks that are similar to that call stack that were associated with other OOM errors. This allows similarities between the clustered call stacks to be identified and more accurately pinpoint the root cause of the OOM error such that the code can be corrected and future OOM error rates may be reduced.

It should be appreciated that the specific steps illustrated in FIG. 9 provide particular methods of identifying call stacks associated with a current OOM error according to various embodiments. Other sequences of steps may also be performed according to alternative embodiments. For example, alternative embodiments may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. Many variations, modifications, and alternatives also fall within the scope of this disclosure.

Figure 10:
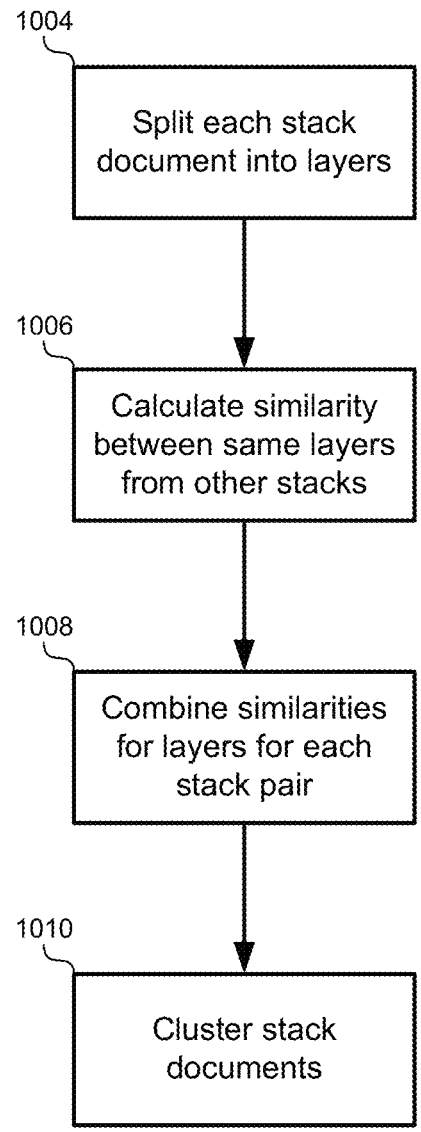
FIG. 10 illustrates a flowchart of a method for generating a plurality of clusters of call stacks, according to some embodiments.

FIG. 10 illustrates a flowchart of a method for generating a plurality of clusters of call stacks, according to some embodiments. Examples of each of the steps in this method are illustrated in the figures below. The method may include splitting each stack document into layers (1004). Instead of performing a similarity analysis on the call stack texts as a whole, call stacks can be divided into a plurality of different layers that correspond to different software layers in the system. This allows for a more accurate comparison between call stacks. For example, if the root cause of the OOM error is found in a particular layer, similarities between that layer may be obscured by a lack of similarity between the rest of the call stacks unless similarity is determined on a layer-by-layer basis. This method ensures that each layer is considered individually.

The method may additionally include calculating a similarity between same layers for each of the available call stacks (1006). Each combination of call stacks may be considered in the system. For example, a call stack from the current OOM error may be compared to each call stack within the repository from other OOM errors. A similarity score for each layer within the two call stacks being considered may be calculated individually. Any measure of similarity may be used between the two layers, and the similarity algorithm may depend on the format used. For example, text comparisons may be used by calculating a Levenshtein distance, a Hamming distance, or other measures of calculating similarity.

In some embodiments, a cosine similarity may be calculated that measures the similarity between layers as a measure of vector similarity. Each unique word in the stack line may represent a dimension in a vector space. The number of occurrences of each word may be its magnitude. Using these data, the layers in each document may be projected into the vector space of another document, and the angle between the two documents may be measured. In some embodiments, the similarity of the leaked object may be determined, where the object name may be the dimension used in the cosine similarity, and the ratio of memory consumed to the memory used may be the magnitude.

The method may additionally include combining similarities for layers for each stack pair (1008). When a pair of stacks are considered, the individual similarities between the individual layers may be calculated as described above. Next, the similarities for each layer may be combined into an overall similarity score for the combination. In some embodiments, a weighted combination may be used such that some layers are weighted heavier than others. For example, highest priority (and thus a heavier weight) may be given to layers with similarity referencing the most leaked objects. This may be determined dynamically by examining the individual similarity scores at runtime. After this, the priority (and higher weights) may be assigned to an application layer, followed by the individual layers in order as they descend away from the application layer. For example weights may be assigned in descending magnitude to the application layer, the framework layer, a third-party code/API layer, aWebLogic layer, a JDK or server layer, and so forth. The weighted combination may then be stored as a similarity score between the two documents in a similarity matrix as described below.

The method may further include clustering stack documents based on similarity scores (1010). Any known method of clustering objects based on a similarity score may be used for this step. For example, a Density-Based Spatial Clustering of Application with Noise (DBSCAN) may be used to scan the similarity matrix and identify documents that are similar to one another. For documents to be part of a cluster, they may be similar to each other within a distance of E1 using the DB SCAN algorithm, and at least MinPts should be within the radius of E1. In some embodiment, the value for MinPts may set to 2, and E1 may be selected after experimenting with training data such that the clusters generated by the training data cover at least approximately 90% of the input, where less than 2% of the documents are grouped into the wrong cluster. These percentages are provided as examples and are not meant to be limiting.

It should be appreciated that the specific steps illustrated in FIG. 10 provide particular methods of clustering call stacks according to various embodiments. Other sequences of steps may also be performed according to alternative embodiments. For example, alternative embodiments may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. Many variations, modifications, and alternatives also fall within the scope of this disclosure.

Figure 11:
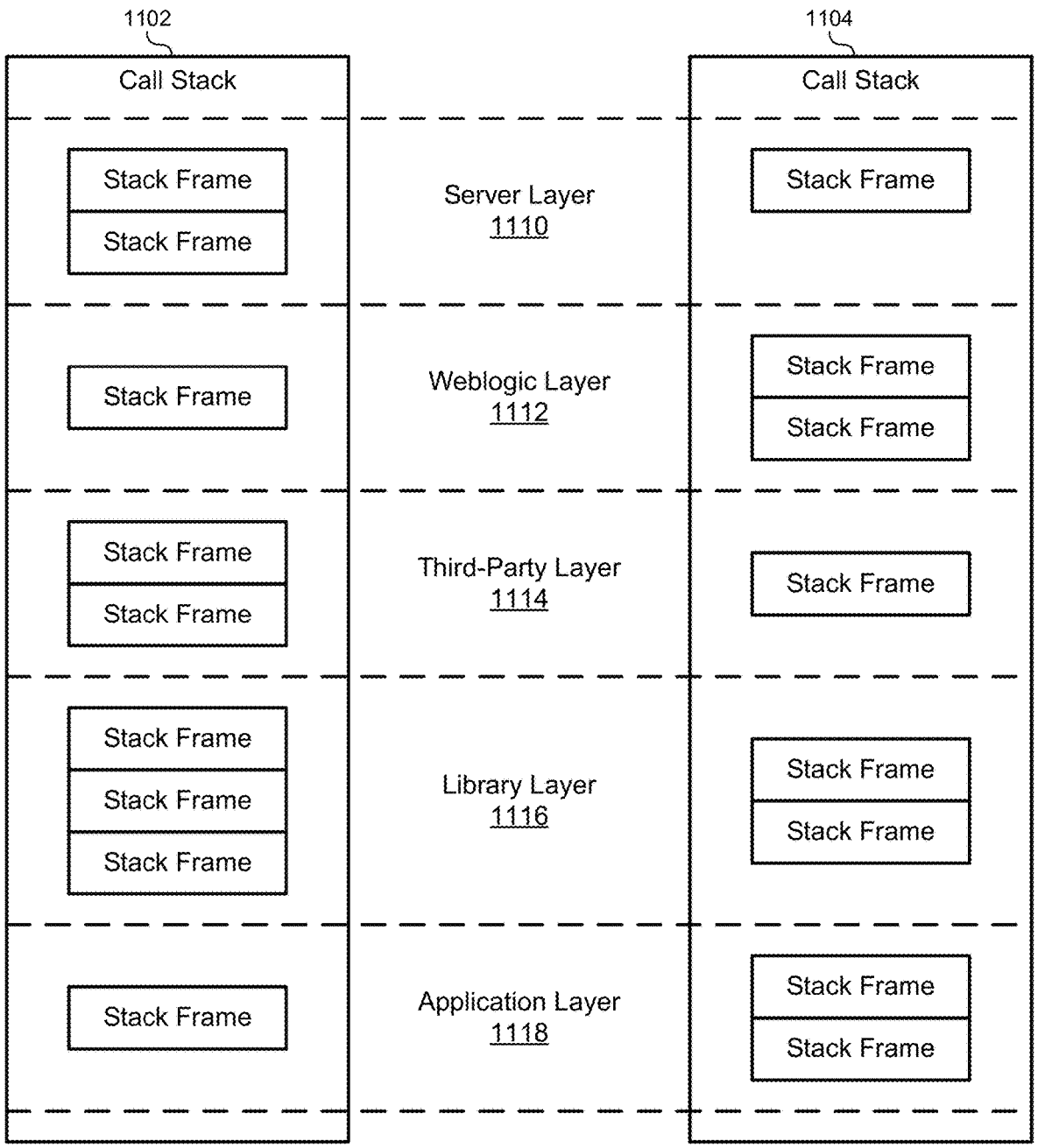
FIG. 11 illustrates how stack frames may be split into layers, according to some embodiments.

FIG. 11 illustrates how stack frames may be split into layers, according to some embodiments. In this example, two stack documents 1102, 1104 have been grouped for comparison. As described above, layers in a particular Java environment have been divided into a server or JDK layer 1110, a WebLogic layer 1112, a third-party/API layer 1114, a framework library layer 1116, and/or an application layer 1118. These layers are provided only by way of example and are not meant to be limiting. Other operating environments may use different logical layers to compare portions of the call stacks 1102, 1104. Each of the call stacks 1102, 1104 can be divided such that individual stack frames and other portions of the call stacks may be assigned to each of the layers.

Figure 12:
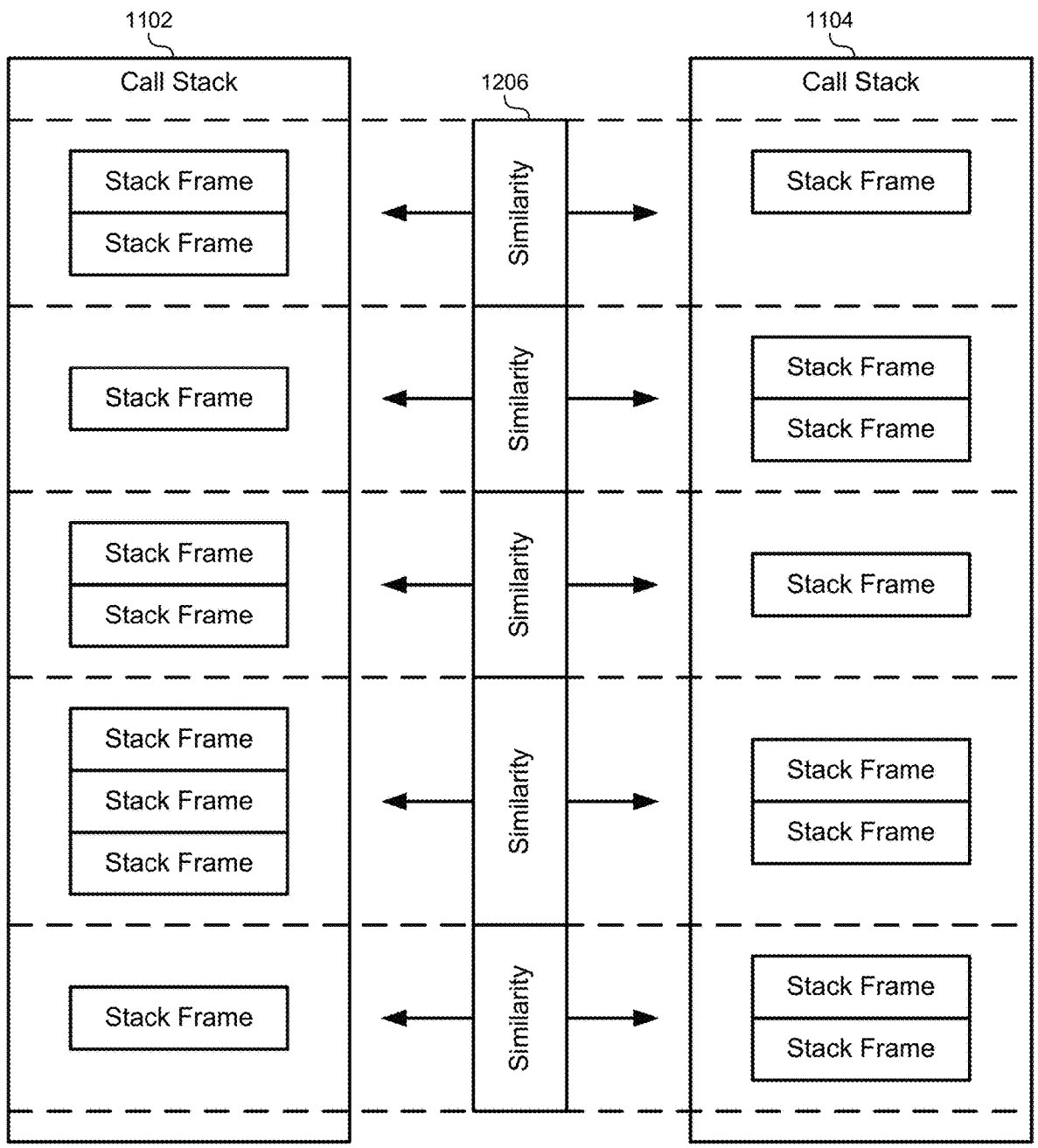
FIG. 12 illustrates how stack frames within the same layers may be individually compared using a similarity algorithm, according to some embodiments.

FIG. 12 illustrates how stack frames within the same layers may be individually compared using a similarity algorithm, according to some embodiments. Note that the individual stack frames or lines within the layers for each call stack 1102, 1104 may be compared with each other. The similarity algorithm 1206 may use a cosine similarity 1204 as described above. In this example, five different similarity scores may be generated, with each score corresponding to one of the layers.

Figure 13:
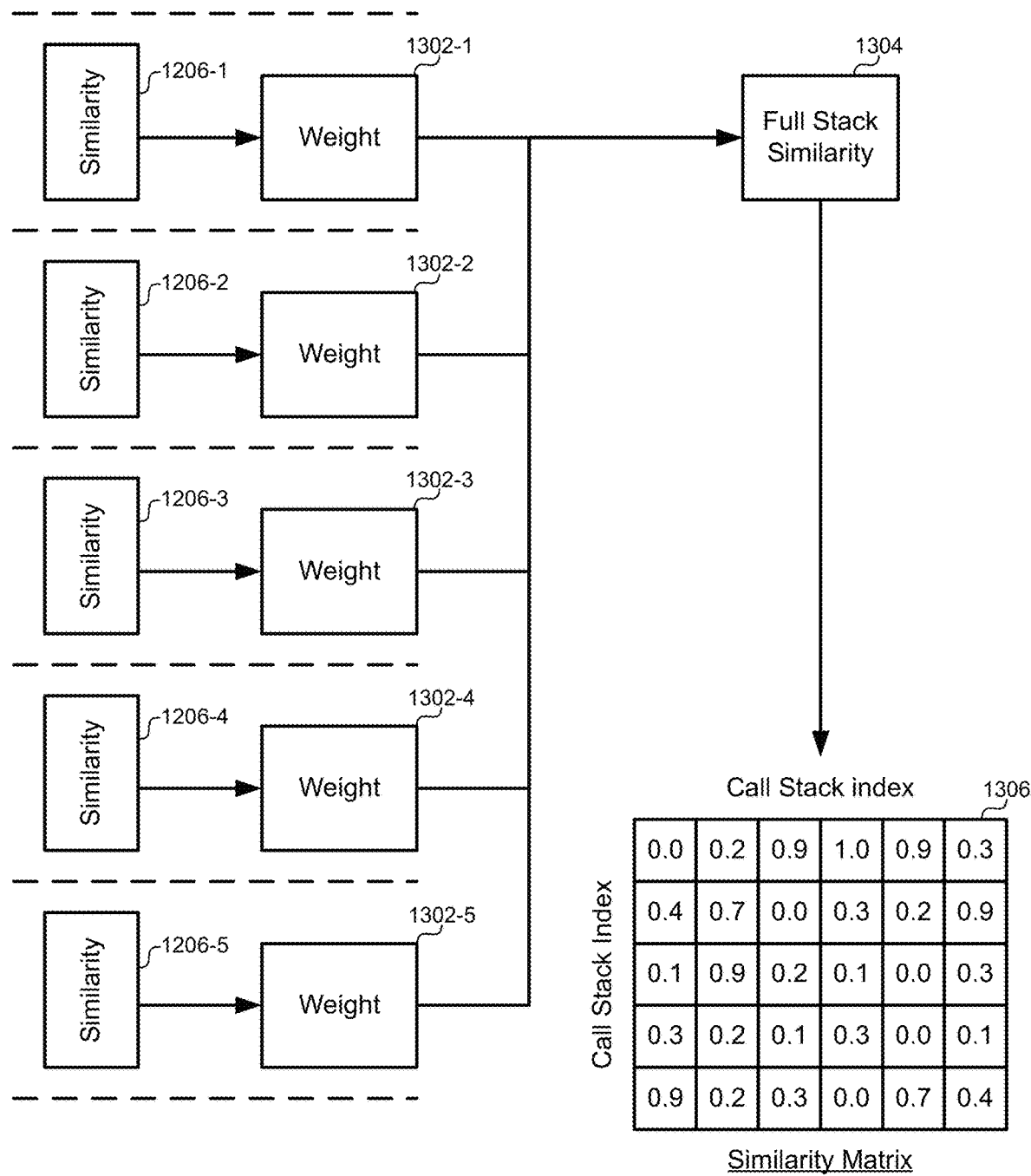
FIG. 13 illustrates how the similarity scores for each layer may be combined into a single similarity score for pairs of call stacks, according to some embodiments.

FIG. 13 illustrates how the similarity scores for each layer may be combined into a single similarity score for pairs of call stacks, according to some embodiments. As described above, the full stack similarity score 1304 may be calculated by using the individual similarity scores 1206 combined with individual weights 1302. Weights 1302 may be applied according to the corresponding stack layer, such that some stack layers are more important to the similarity score than others. Additionally, some embodiments may change the weights dynamically for different layers based on the number of leaked objects associated with each layer. For example, the weight 1302-3 for the similarity score 1206-3 may be increased if a large number leaked objects are attributed to operations within that stack layer.

The full stack similarity score 1304 may be scaled such that it is a numerical value between 0.0 and 1.0. The full stack similarity score 1304 for each pair of compared call stacks can be stored in a similarity matrix 1306. Each call stack in the repository may correspond to a row and/or column in the similarity matrix such that each call stack row/column includes a similarity score in comparison to each of the other call stacks in the repository.

Figure 14:
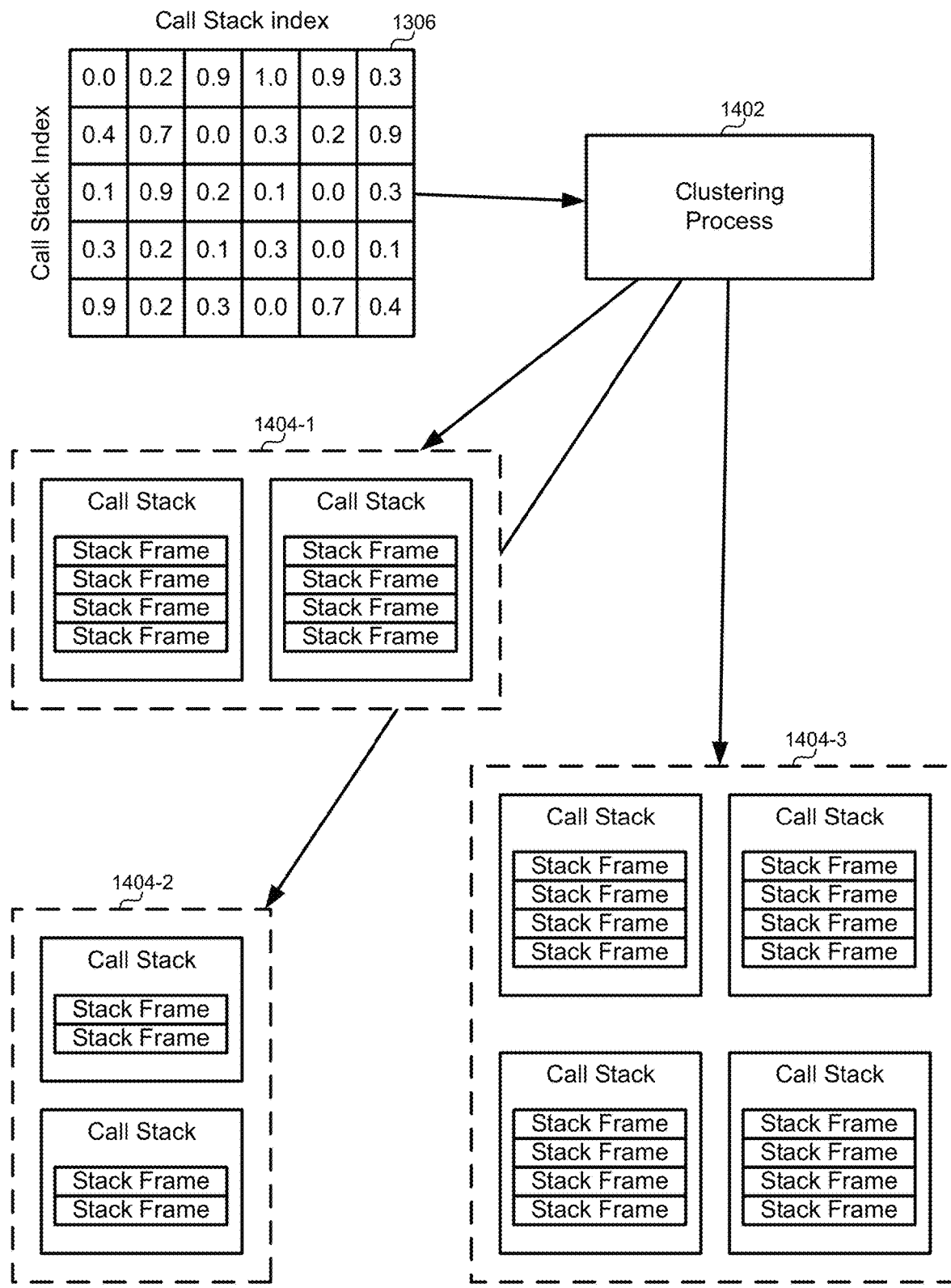
FIG. 14 illustrates how call stacks from the similarity matrix may be clustered, according to some embodiments.

FIG. 14 illustrates how call stacks from the similarity matrix may be clustered, according to some embodiments. Using one of the available clustering algorithms, such as the DBSCAN algorithm described above, the entries in the similarity matrix 1306 may be accessed and clustered to form a plurality of clusters. A cluster may be formed for each of the call stacks associated with the current OOM error. In this example, three call stacks may be identified as being associated with a current OOM error. Using the algorithm described above, three clusters 1404 of call stacks may be formed. A diagnostic tool may provide each cluster of call stacks as the OOM error is analyzed. The diagnostic tool may highlight similarities and/or differences between the text in each of the call stacks in each of the clusters 1404. For example, the two call stacks in cluster 1404-1 may be displayed next to each other in an interface, with similarities highlighted and portions of the call stacks that reference leak suspects from the memory dump emphasized.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 15:
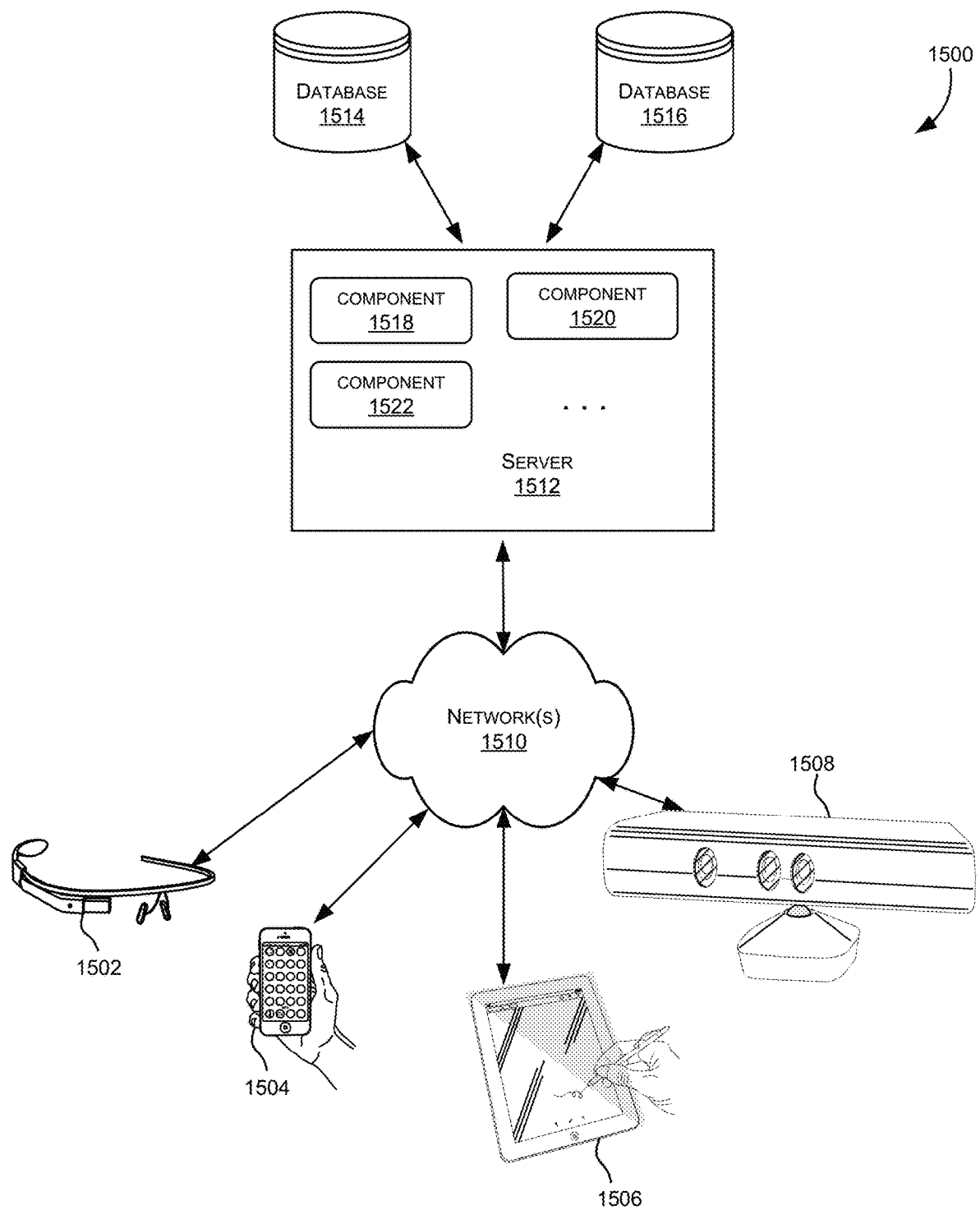

FIG. 15 depicts a simplified diagram of a distributed system 1500 for implementing one of the embodiments. In the illustrated embodiment, distributed system 1500 includes one or more client computing devices 1502, 1504, 1506, and 1508, which are configured to execute and operate a client application such as a web browser, proprietary client (e.g., Oracle Forms), or the like over one or more network(s) 1510. Server 1512 may be communicatively coupled with remote client computing devices 1502, 1504, 1506, and 1508 via network 1510.

In various embodiments, server 1512 may be adapted to run one or more services or software applications provided by one or more of the components of the system. In some embodiments, these services may be offered as web-based or cloud services or under a Software as a Service (SaaS) model to the users of client computing devices 1502, 1504, 1506, and/or 1508. Users operating client computing devices 1502, 1504, 1506, and/or 1508 may in turn utilize one or more client applications to interact with server 1512 to utilize the services provided by these components.

In the configuration depicted in the figure, the software components 1518, 1520 and 1522 of system 1500 are shown as being implemented on server 1512. In other embodiments, one or more of the components of system 1500 and/or the services provided by these components may also be implemented by one or more of the client computing devices 1502, 1504, 1506, and/or 1508. Users operating the client computing devices may then utilize one or more client applications to use the services provided by these components. These components may be implemented in hardware, firmware, software, or combinations thereof. It should be appreciated that various different system configurations are possible, which may be different from distributed system 1500. The embodiment shown in the figure is thus one example of a distributed system for implementing an embodiment system and is not intended to be limiting.

Client computing devices 1502, 1504, 1506, and/or 1508 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1502, 1504, 1506, and 1508 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1510.

Although exemplary distributed system 1500 is shown with four client computing devices, any number of client computing devices may be supported. Other devices, such as devices with sensors, etc., may interact with server 1512.

Network(s) 1510 in distributed system 1500 may be any type of network that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1510 can be a local area network (LAN), such as one based on Ethernet, Token-Ring and/or the like. Network(s) 1510 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1512 may be adapted to run one or more services or software applications described in the foregoing disclosure. For example, server 1512 may correspond to a server for performing processing described above according to an embodiment of the present disclosure.

Server 1512 may run an operating system including any of those discussed above, as well as any commercially available server operating system. Server 1512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1512 may include one or more applications to analyze and consolidate data feeds and/or event updates received from users of client computing devices 1502, 1504, 1506, and 1508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 1512 may also include one or more applications to display the data feeds and/or real-time events via one or more display devices of client computing devices 1502, 1504, 1506, and 1508.

Distributed system 1500 may also include one or more databases 1514 and 1516. Databases 1514 and 1516 may reside in a variety of locations. By way of example, one or more of databases 1514 and 1516 may reside on a non-transitory storage medium local to (and/or resident in) server 1512. Alternatively, databases 1514 and 1516 may be remote from server 1512 and in communication with server 1512 via a network-based or dedicated connection. In one set of embodiments, databases 1514 and 1516 may reside in a storage-area network (SAN). Similarly, any necessary files for performing the functions attributed to server 1512 may be stored locally on server 1512 and/or remotely, as appropriate. In one set of embodiments, databases 1514 and 1516 may include relational databases, such as databases provided by Oracle, that are adapted to store, update, and retrieve data in response to SQL-formatted commands.

Figure 16:
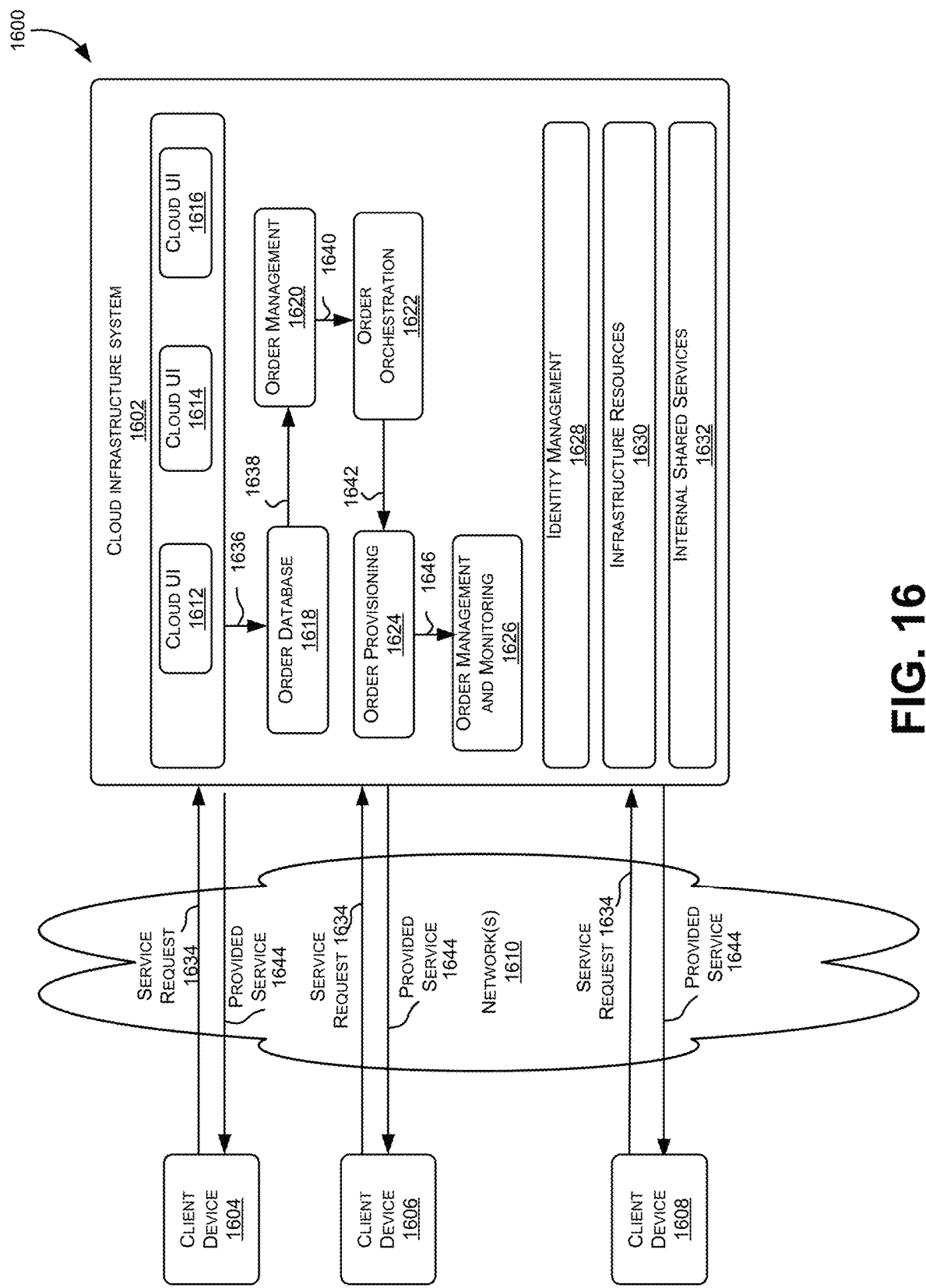
FIG. 16 illustrates a simplified block diagram of components of a system environment by which services provided by the components of an embodiment system may be offered as cloud services.

FIG. 16 is a simplified block diagram of one or more components of a system environment 1600 by which services provided by one or more components of an embodiment system may be offered as cloud services, in accordance with an embodiment of the present disclosure. In the illustrated embodiment, system environment 1600 includes one or more client computing devices 1604, 1606, and 1608 that may be used by users to interact with a cloud infrastructure system 1602 that provides cloud services. The client computing devices may be configured to operate a client application such as a web browser, a proprietary client application (e.g., Oracle Forms), or some other application, which may be used by a user of the client computing device to interact with cloud infrastructure system 1602 to use services provided by cloud infrastructure system 1602.

It should be appreciated that cloud infrastructure system 1602 depicted in the figure may have other components than those depicted. Further, the system shown in the figure is only one example of a cloud infrastructure system that may incorporate some embodiments. In some other embodiments, cloud infrastructure system 1602 may have more or fewer components than shown in the figure, may combine two or more components, or may have a different configuration or arrangement of components.

Client computing devices 1604, 1606, and 1608 may be devices similar to those described above for 1502, 1504, 1506, and 1508.

Although exemplary system environment 1600 is shown with three client computing devices, any number of client computing devices may be supported. Other devices such as devices with sensors, etc. may interact with cloud infrastructure system 1602.

Network(s) 1610 may facilitate communications and exchange of data between clients 1604, 1606, and 1608 and cloud infrastructure system 1602. Each network may be any type of network that can support data communications using any of a variety of commercially-available protocols, including those described above for network(s) 1510.

Cloud infrastructure system 1602 may comprise one or more computers and/or servers that may include those described above for server 1512.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1602 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1602 may be adapted to automatically provision, manage and track a customer's subscription to services offered by cloud infrastructure system 1602. Cloud infrastructure system 1602 may provide the cloud services via different deployment models. For example, services may be provided under a public cloud model in which cloud infrastructure system 1602 is owned by an organization selling cloud services (e.g., owned by Oracle) and the services are made available to the general public or different industry enterprises. As another example, services may be provided under a private cloud model in which cloud infrastructure system 1602 is operated solely for a single organization and may provide services for one or more entities within the organization. The cloud services may also be provided under a community cloud model in which cloud infrastructure system 1602 and the services provided by cloud infrastructure system 1602 are shared by several organizations in a related community. The cloud services may also be provided under a hybrid cloud model, which is a combination of two or more different models.

In some embodiments, the services provided by cloud infrastructure system 1602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1602. Cloud infrastructure system 1602 then performs processing to provide the services in the customer's subscription order.

In some embodiments, the services provided by cloud infrastructure system 1602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1602 may also include infrastructure resources 1630 for providing the resources used to provide various services to customers of the cloud infrastructure system. In one embodiment, infrastructure resources 1630 may include pre-integrated and optimized combinations of hardware, such as servers, storage, and networking resources to execute the services provided by the PaaS platform and the SaaS platform.

In some embodiments, resources in cloud infrastructure system 1602 may be shared by multiple users and dynamically re-allocated per demand. Additionally, resources may be allocated to users in different time zones. For example, cloud infrastructure system 1630 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1632 may be provided that are shared by different components or modules of cloud infrastructure system 1602 and by the services provided by cloud infrastructure system 1602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1602, and the like.

In one embodiment, as depicted in the figure, cloud management functionality may be provided by one or more modules, such as an order management module 1620, an order orchestration module 1622, an order provisioning module 1624, an order management and monitoring module 1626, and an identity management module 1628. These modules may include or be provided using one or more computers and/or servers, which may be general purpose computers, specialized server computers, server farms, server clusters, or any other appropriate arrangement and/or combination.

In exemplary operation 1634, a customer using a client device, such as client device 1604, 1606 or 1608, may interact with cloud infrastructure system 1602 by requesting one or more services provided by cloud infrastructure system 1602 and placing an order for a subscription for one or more services offered by cloud infrastructure system 1602. In certain embodiments, the customer may access a cloud User Interface (UI), cloud UI 1612, cloud UI 1614 and/or cloud UI 1616 and place a subscription order via these UIs. The order information received by cloud infrastructure system 1602 in response to the customer placing an order may include information identifying the customer and one or more services offered by the cloud infrastructure system 1602 that the customer intends to subscribe to.

After an order has been placed by the customer, the order information is received via the cloud UIs, 1612, 1614 and/or 1616.

At operation 1636, the order is stored in order database 1618. Order database 1618 can be one of several databases operated by cloud infrastructure system 1618 and operated in conjunction with other system elements.

At operation 1638, the order information is forwarded to an order management module 1620. In some instances, order management module 1620 may be configured to perform billing and accounting functions related to the order, such as verifying the order, and upon verification, booking the order.

At operation 1640, information regarding the order is communicated to an order orchestration module 1622. Order orchestration module 1622 may utilize the order information to orchestrate the provisioning of services and resources for the order placed by the customer. In some instances, order orchestration module 1622 may orchestrate the provisioning of resources to support the subscribed services using the services of order provisioning module 1624.

In certain embodiments, order orchestration module 1622 enables the management of business processes associated with each order and applies business logic to determine whether an order should proceed to provisioning. At operation 1642, upon receiving an order for a new subscription, order orchestration module 1622 sends a request to order provisioning module 1624 to allocate resources and configure those resources needed to fulfill the subscription order. Order provisioning module 1624 enables the allocation of resources for the services ordered by the customer. Order provisioning module 1624 provides a level of abstraction between the cloud services provided by cloud infrastructure system 1600 and the physical implementation layer that is used to provision the resources for providing the requested services. Order orchestration module 1622 may thus be isolated from implementation details, such as whether or not services and resources are actually provisioned on the fly or pre-provisioned and only allocated/assigned upon request.

At operation 1644, once the services and resources are provisioned, a notification of the provided service may be sent to customers on client devices 1604, 1606 and/or 1608 by order provisioning module 1624 of cloud infrastructure system 1602.

At operation 1646, the customer's subscription order may be managed and tracked by an order management and monitoring module 1626. In some instances, order management and monitoring module 1626 may be configured to collect usage statistics for the services in the subscription order, such as the amount of storage used, the amount data transferred, the number of users, and the amount of system up time and system down time.

In certain embodiments, cloud infrastructure system 1600 may include an identity management module 1628. Identity management module 1628 may be configured to provide identity services, such as access management and authorization services in cloud infrastructure system 1600. In some embodiments, identity management module 1628 may control information about customers who wish to utilize the services provided by cloud infrastructure system 1602. Such information can include information that authenticates the identities of such customers and information that describes which actions those customers are authorized to perform relative to various system resources (e.g., files, directories, applications, communication ports, memory segments, etc.) Identity management module 1628 may also include the management of descriptive information about each customer and about how and by whom that descriptive information can be accessed and modified.

Figure 17:
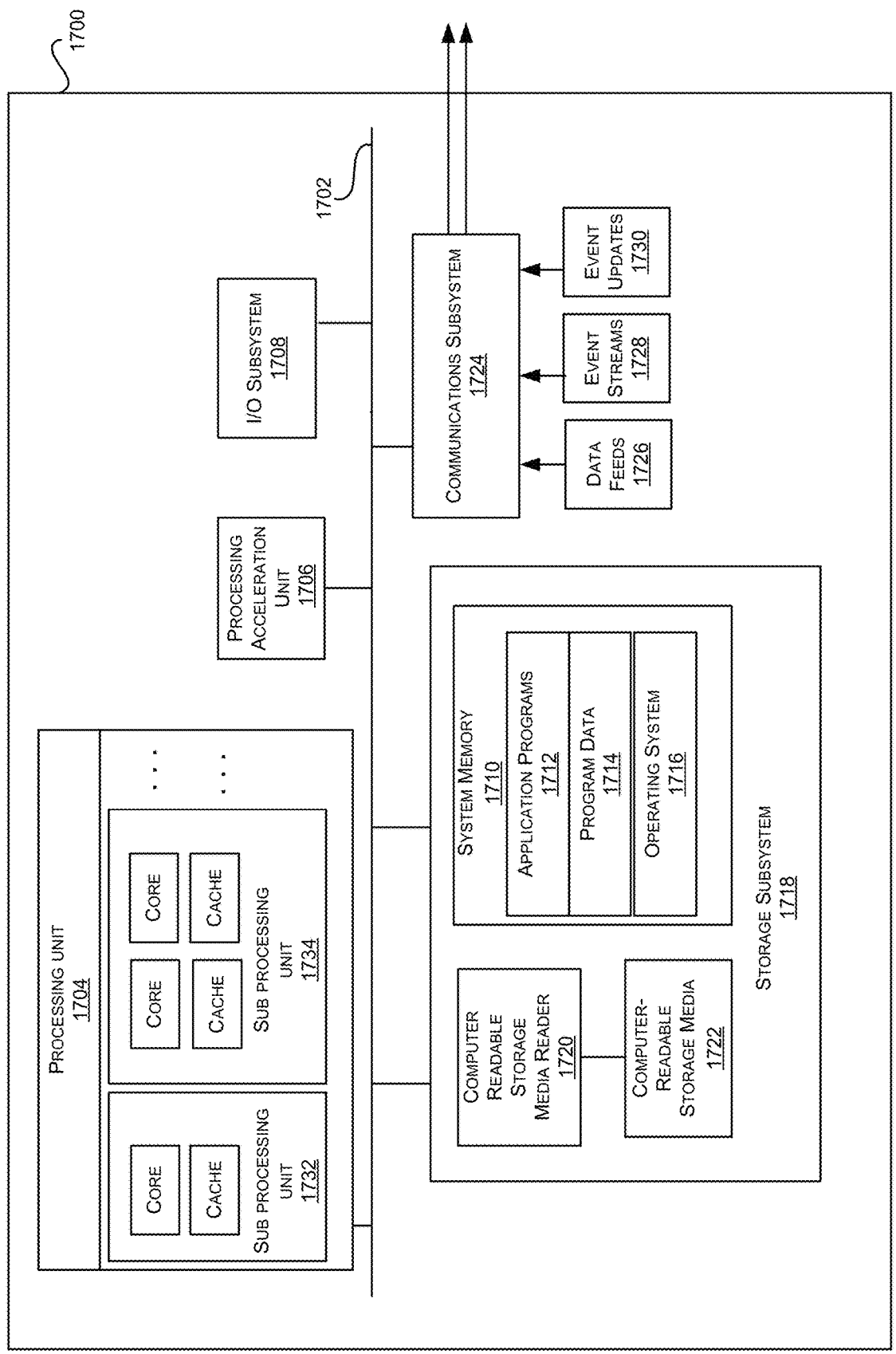
FIG. 17 illustrates an exemplary computer system, in which various embodiments may be implemented.

FIG. 17 illustrates an exemplary computer system 1700, in which various embodiments may be implemented. The system 1700 may be used to implement any of the computer systems described above. As shown in the figure, computer system 1700 includes a processing unit 1704 that communicates with a number of peripheral subsystems via a bus subsystem 1702. These peripheral subsystems may include a processing acceleration unit 1706, an I/O subsystem 1708, a storage subsystem 1718 and a communications subsystem 1724. Storage subsystem 1718 includes tangible computer-readable storage media 1722 and a system memory 1710.

Bus subsystem 1702 provides a mechanism for letting the various components and subsystems of computer system 1700 communicate with each other as intended. Although bus subsystem 1702 is shown schematically as a single bus, alternative embodiments of the bus subsystem may utilize multiple buses. Bus subsystem 1702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1704, which can be implemented as one or more integrated circuits (e.g., a conventional microprocessor or microcontroller), controls the operation of computer system 1700. One or more processors may be included in processing unit 1704. These processors may include single core or multicore processors. In certain embodiments, processing unit 1704 may be implemented as one or more independent processing units 1732 and/or 1734 with single or multicore processors included in each processing unit. In other embodiments, processing unit 1704 may also be implemented as a quad-core processing unit formed by integrating two dual-core processors into a single chip.

In various embodiments, processing unit 1704 can execute a variety of programs in response to program code and can maintain multiple concurrently executing programs or processes. At any given time, some or all of the program code to be executed can be resident in processor(s) 1704 and/or in storage subsystem 1718. Through suitable programming, processor(s) 1704 can provide various functionalities described above. Computer system 1700 may additionally include a processing acceleration unit 1706, which can include a digital signal processor (DSP), a special-purpose processor, and/or the like.

I/O subsystem 1708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1700 may comprise a storage subsystem 1718 that comprises software elements, shown as being currently located within a system memory 1710. System memory 1710 may store program instructions that are loadable and executable on processing unit 1704, as well as data generated during the execution of these programs.

Depending on the configuration and type of computer system 1700, system memory 1710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1704. In some implementations, system memory 1710 may include multiple different types of memory, such as static random access memory (SRAM) or dynamic random access memory (DRAM). In some implementations, a basic input/output system (BIOS), containing the basic routines that help to transfer information between elements within computer system 1700, such as during start-up, may typically be stored in the ROM. By way of example, and not limitation, system memory 1710 also illustrates application programs 1712, which may include client applications, Web browsers, mid-tier applications, relational database management systems (RDBMS), etc., program data 1714, and an operating system 1716. By way of example, operating system 1716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1718 may also provide a tangible computer-readable storage medium for storing the basic programming and data constructs that provide the functionality of some embodiments. Software (programs, code modules, instructions) that when executed by a processor provide the functionality described above may be stored in storage subsystem 1718. These software modules or instructions may be executed by processing unit 1704. Storage subsystem 1718 may also provide a repository for storing data used in accordance with some embodiments.

Storage subsystem 1700 may also include a computer-readable storage media reader 1720 that can further be connected to computer-readable storage media 1722.

Together and, optionally, in combination with system memory 1710, computer-readable storage media 1722 may comprehensively represent remote, local, fixed, and/or removable storage devices plus storage media for temporarily and/or more permanently containing, storing, transmitting, and retrieving computer-readable information.

Computer-readable storage media 1722 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1700.

By way of example, computer-readable storage media 1722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1722 may include, but is not limited to, Zip® drives, flash memory cards, universal serial bus (USB) flash drives, secure digital (SD) cards, DVD disks, digital video tape, and the like. Computer-readable storage media 1722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1700.

Communications subsystem 1724 provides an interface to other computer systems and networks. Communications subsystem 1724 serves as an interface for receiving data from and transmitting data to other systems from computer system 1700. For example, communications subsystem 1724 may enable computer system 1700 to connect to one or more devices via the Internet. In some embodiments communications subsystem 1724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1724 can provide wired network connectivity (e.g., Ethernet) in addition to or instead of a wireless interface.

In some embodiments, communications subsystem 1724 may also receive input communication in the form of structured and/or unstructured data feeds 1726, event streams 1728, event updates 1730, and the like on behalf of one or more users who may use computer system 1700.

By way of example, communications subsystem 1724 may be configured to receive data feeds 1726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1724 may also be configured to receive data in the form of continuous data streams, which may include event streams 1728 of real-time events and/or event updates 1730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1724 may also be configured to output the structured and/or unstructured data feeds 1726, event streams 1728, event updates 1730, and the like to one or more databases that may be in communication with one or more streaming data source computers coupled to computer system 1700.

Computer system 1700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of clustering call stacks from a plurality of memory dumps resulting from out-of-memory errors, the method comprising:
    accessing a memory dump resulting from an out-of-memory error;
    identifying one or more first call stacks in the memory dump that are determined to be associated with the out-of-memory error;
    accessing one or more second call stacks from one or more other memory dumps that were determined to be associated with one or more other out-of-memory errors;
    generating a plurality of clusters for the one or more first call stacks with the one or more second call stacks; and
    providing a cluster from the plurality of clusters for an analysis of the out-of-memory error.

2. The method of claim 1, further comprising processing the memory dump with a memory analysis tool that indexes the memory dump and generates a statistical analysis of object types found in the memory dump.

3. The method of claim 1, wherein the memory dump comprises objects allocated on a heap.

4. The method of claim 1, wherein identifying the one or more first call stacks in the memory dump comprises:
    identifying object classes that consume the most memory in the memory dump.

5. The method of claim 4, wherein identifying the one or more first call stacks in the memory dump further comprises:
    identifying the one or more first call stacks as referencing the object classes that consume the most memory in the memory dump.

6. The method of claim 1, wherein identifying the one or more first call stacks in the memory dump comprises:
    calculating an amount of memory used by a process;
    determining a maximum amount of memory allowed to be used by the process; and
    calculating a ratio of the memory used by the process in comparison to the maximum amount of memory allowed to be used by the process.

7. The method of claim 6, wherein identifying the one or more first call stacks in the memory dump further comprises:
    identifying the one or more first call stacks as belonging to the process if the ratio exceeds a predetermined threshold.

8. A non-transitory computer-readable medium comprising instructions that, when executed by one or more processors, cause the one or more processors to perform operations comprising:
    accessing a memory dump resulting from an out-of-memory error;
    identifying one or more first call stacks in the memory dump that are determined to be associated with the out-of-memory error;
    accessing one or more second call stacks from one or more other memory dumps that were determined to be associated with one or more other out-of-memory errors;
    generating a plurality of clusters for the one or more first call stacks with the one or more second call stacks; and
    providing a cluster from the plurality of clusters for an analysis of the out-of-memory error.

9. The non-transitory computer-readable medium of claim 8, wherein identifying the one or more first call stacks in the memory dump comprises:
    identifying a thread for which a memory request triggered the out-of-memory error; and identifying the one or more first call stacks as belonging to the thread.

10. The non-transitory computer-readable medium of claim 8, wherein identifying the one or more first call stacks in the memory dump comprises:
   identifying one or more threads operating for more than a predetermined time limit; and
   identifying the one or more first call stacks as belonging to the one or more threads.

11. The non-transitory computer-readable medium of claim 8, wherein identifying the one or more first call stacks in the memory dump comprises:
   identifying one or more worker threads that were processing events or requests when the out-of-memory error occurred;
   determining whether an amount of memory used by the one or more worker threads exceeds a predetermined threshold; and
   identifying the one or more first call stacks as belonging to the one or more worker threads.

12. The non-transitory computer-readable medium of claim 8, further comprising storing the one or more first call stacks in a document repository with the one or more second call stacks.

13. The non-transitory computer-readable medium of claim 8, wherein generating the plurality of clusters comprises:
   dividing each of the one or more first call stacks and the one or more second call stacks into a plurality of layers.

14. The non-transitory computer-readable medium of claim 13, wherein generating the plurality of clusters further comprises:
   generating a similarity score between each of the plurality of layers individually.

15. The non-transitory computer-readable medium of claim 14, wherein generating the plurality of clusters further comprises:
   generating a full stack similarity score through a weighted combination of the similarity score for each of the plurality of layers.

16. A system comprising:
   one or more processors; and
   one or more memory devices comprising instructions that, when executed by the one or more processors, cause the one or more processors to perform operations comprising:
     accessing a memory dump resulting from an out-of-memory error;
     identifying one or more first call stacks in the memory dump that are determined to be associated with the out-of-memory error;
     accessing one or more second call stacks from one or more other memory dumps that were determined to be associated with one or more other out-of-memory errors;
     generating a plurality of clusters for the one or more first call stacks with the one or more second call stacks; and
     providing a cluster from the plurality of clusters for an analysis of the out-of-memory error.

17. The system of claim 16, wherein generating the plurality of clusters comprises:
   dividing each of the one or more first call stacks and the one or more second call stacks into a plurality of layers;
   generating a similarity score between each of the plurality of layers individually; and
   generating a full stack similarity score through a weighted combination of the similarity score for each of the plurality of layers.

18. The system of claim 17, wherein the similarity score comprises a cosine similarity wherein each unique word in a stack line represents a dimension, and wherein a number of occurrences of each unique word represents a magnitude of a vector.

19. The system of claim 16, wherein generating the plurality of clusters comprises using a Density-based Spatial Clustering of Application with Noise (DBSCAN) algorithm to form the plurality of clusters from a similarity matrix, wherein the similarity matrix stores a similarity score for each combination of call stacks.

20. The system of claim 16, further comprising highlighting similarities between call stacks in the cluster from the plurality of clusters.

* * * * *